(12) United States Patent
Kim

(10) Patent No.: US 6,958,362 B2
(45) Date of Patent: Oct. 25, 2005

(54) METHOD FOR MANUFACTURING COLLOID ALUMINUM SILICA GELS

(76) Inventor: In Kyu Kim, 9330 7th St., Sutie "A", Rancho Cucamonga, CA (US) 91730

( * ) Notice: Subject to any disclaimer, the term of this patent is extended or adjusted under 35 U.S.C. 154(b) by 0 days.

(21) Appl. No.: 10/898,230

(22) Filed: Jul. 26, 2004

(65) Prior Publication Data

US 2005/0032663 A1 Feb. 10, 2005

Related U.S. Application Data

(62) Division of application No. 10/747,035, filed on Dec. 30, 2003, which is a division of application No. 09/878,963, filed on Jun. 13, 2001, now Pat. No. 6,699,827.

(30) Foreign Application Priority Data

Jun. 13, 2000 (KR) .................................. 10-2000-32494

(51) Int. Cl.⁷ .............................................. C01B 33/14
(52) U.S. Cl. ........................................ 516/34; 510/508
(58) Field of Search ............................ 516/34; 510/508

(56) References Cited

U.S. PATENT DOCUMENTS 5,093,197 A * 3/1992 Howard et al. .............. 428/372

* cited by examiner

*Primary Examiner*—Charles Boyer
(74) *Attorney, Agent, or Firm*—Birch, Stewart, Kolasch & Birch, LLP

(57) ABSTRACT

A novel colloid active component, a method for manufacturing colloid aluminum silica gel, and a surfactant containing the same are disclosed, wherein the method includes the steps of: (a) dissolving a mixture of aluminum oxide, silicic acid, potassium, iron oxide, sulfuric acid and water into sulfuric acid; (b) adding potassium sulfate solution into the solution, and stirring at a low temperature to produce compositions with soluble aluminum double salt; (c) purifying the compositions to obtain a very pure and dense aluminum potassium sulfate; (d) adding aluminum silicate and water to produce alkali metal polysilicate-sulfate water salt chelate; (e) polymerizing and precipitating the resultant; (f) adding Mgo, $Fe_2O_3$, $Ca(OH)_2$, NaOH, KOH, and distilled water; (g) purifying and drying the chelate; (h) mixing the resulting microsphere, with sulfuric acid; (i) further treating the mixture and performing vapor treatment to obtain aluminum silicate molecular sieve; and, (j) polymerizing the aluminum silicate molecular sieves to a highly dense heel.

4 Claims, No Drawings

METHOD FOR MANUFACTURING COLLOID ALUMINUM SILICA GELS

This application is a Divisional of application Ser. No. 10/747,035 filed Dec. 30, 2003 which is a divisional of application Ser. Ser. No. 09/878,963, filed on Jun. 13, 2001, now U.S. Pat. No. 6,699,827 issued Mar. 2, 2004, the entire contents of which are hereby incorporated by reference and for which priority is claimed under 35 U.S.C. § 120; and this application claims priority of Application No. 10-2000-32494 filed in Korea on Jun. 13, 2000 under 35 U.S.C. § 119.

BACKGROUND OF THE INVENTION

Field of the Invention

The present invention relates to a method for manufacturing an active component of surfactant, a surfactant containing the same, and a method for using the surfactant. In particular, the present invention relates to a method for manufacturing colloid particles composed of silicon oxides having the structural characteristics by calcining at a high temperature, a novel colloidal active component of surfactant made of compounds containing the same, and a method for using the surfactant.

BACKGROUND OF THE RELATED ART

An ecological environment for a human, in spite of the various industrially developed structures thereof, is now in a danger of ecological crisis due to heavy pollution in rivers and lands caused by chemical abuse, and pollution in the atmosphere caused by harmful chemicals and products from side reactions. Human beings have enjoyed their much success in technical developments for synthesizing or manufacturing every kind of materials for the convenience of a life. However, they failed to notice the importance of environmentally-friendly technologies and thus, the technologies for decomposing and recycling wastes have been consequently neglected.

Among other many well-known pollutants, effluent from surfactants and detergents are the chief factors in water and land pollution. Typically used detergents contain polypropylene benzene sulfonate type alkyl compounds as a main component (ABS:Alkyl Benzene Sulfonate), which was later discovered to cause very severe water pollution in an ecological sense, and further being harmful to a human body. Therefore, linear alkyl benzene sulfonate (LABS) soon replaced as an attempt to solve the water pollution problems. Unfortunately, however, the LABS was much more toxic compared to ABS although it had higher water solubility. Moreover, when used alone, the conventional detergents, e.g., sulfates or sulfonates, were not very effective as far as the cleansing mechanism is concerned, thus other additives, e.g., a capturing agent, a precipitation promoter, or a chelating agent had to be added.

Consequently, the conventional detergents were blamed for causing dermatitis by releasing a great amount of additives, including submicron calcium carbonate, NTA (nitrilo triacetic acid) containing triple sodium phosphate, HEDTA(hexamethylene diamine tetraacetic acid), DTPA (dimethylene triamine pentaacetic acid). In addition, they created a main factor in slowing down biological decomposition, i.e., a biological stimulant in the water, causing eutrophication, which deterred the water's self-cleansing action. Overall, they brought a severe pollution in water and public sanitation.

As an attempt to solve the problems described above, highly biodegradable detergents by microorganisms, having fatty acid type surfactants as a base, were introduced since they are known to have a relatively high safety in ecological prospect. However, the high degree of biodegradation of detergents was proved to be existing merely in theory, and it was not strong enough or appropriate for the current environment with a number of various nasty pollutants therein. Rather, the detergents play an important role for a polymerization linkage and worsen the pollution also. Interestingly, other developed nations have already banned or restricted the use of the detergents since it was discovered that the detergents are carsenogenic to a human, and have an estrogenic effect.

Accordingly, researches have been progressed for developing surfactants that are ecologically very safe and environmentally-friendly, and developing additives or builders that are essential for detergent formulation, but not much success has been made.

SUMMARY OF THE INVENTION

Accordingly, the present invention is directed to a method for manufacturing an active component of surfactant, surfactant and a method for using the surfactant that substantially obviate one or more problems due to limitations and disadvantages of the related art.

An object of the present invention is to provide a novel colloid active component for solving water and land pollution, and at the same time, being safe to a human and the ecosystem, so that it can be a versatile material in many fields, particularly, adding economic value and applicability to an industrial use.

Another object of the present invention is to provide a method for manufacturing colloid aluminum silica gel, comprising the steps of:

(a) dissolving a mixing solution of aluminum hydroxide in sulfuric acid, wherein the mixture includes aluminum oxide, silicic acid, potassium, iron oxide, sulfuric acid and water;

(b) adding potassium sulfate solution into the solution from (a), and stirring the mixture at a low temperature to produce compositions containing soluble aluminum double salt;

(c) purifying the compositions of the step (b) to obtain aluminum potassium sulfate with high purity and density;

(d) adding aluminum silicate and water to the aluminum potassium sulfate of the step (c) to produce alkali metal polysilicate-sulfate water salt chelate;

(e) polymerizing and precipitating the alkali metal polysilicate-sulfate water salt chelate at a low temperature to produce pectograph of aluminum silicate sieve;

(f) producing chelate by adding magnesia, iron oxide, calcium hydroxide, sodium oxide, potassium oxide, and distilled water in sequence;

(g) purifying and drying the chelate of the step (f) to produce dried microsphere;

(h) melting the dried microsphere of the step (g) at a high temperature, cooling, hardening, and mixing with diluted (thin) sulfuric acid;

(i) carrying out sequential treatments on the resultant of the step (h), that is, polymerizing, cleansing, heating, dehydrating, or drying, and performing vapor treatment, to obtain powder aluminum silicate molecular sieve with a high absorption of which particle size is under $1\mu$; and, (j) polymerizing the aluminum silicate molecular sieves with each other until they are matured to be a highly dense heel.

The step (c) can be replaced with a cleansing step, in which the compositions are continuously heated and stirred, and 0.1% of enzyme by weight is slowly dropped thereto.

As for the step (d), aluminum sulfate and aluminum silicate can be mixed at a ratio of 1:3 by weight, and water was added to produce 24-water salt alkali metal polysilicate-sulfate chelates.

In addition, a preferred method for manufacturing the aforementioned colloid aluminum silica gel further comprises a step, in which the matured heel from the step (j) passes through an ion-exchange resin layer several times to produce very pure and consistent colloid aluminum silica gel, and later the consistent colloid is crushed.

Still another object of the present invention is to provide a surfactant having characteristic of both silica and alumina, being void of any chemical bond to form polymers by reacting with other molecules in the ecosystem, having an ability of metal substitution of zeolite at a low temperature, and containing evenly purified colloid aluminum silica gel having the particle size within a range of from several nm to several $\mu$m for a diameter.

Here, the colloid aluminum silica gel can be manufactured by a process comprising the steps of:

(a) dissolving a mixing solution of aluminum hydroxide in sulfuric acid, wherein the mixture includes aluminum oxide, silicic acid, potassium, iron oxide, sulfuric acid and water;

(b) adding potassium sulfate solution into the solution from (a), and stirring the mixture at a low temperature to produce compositions containing soluble aluminum double salt;

(c) purifying the compositions of the step (b) to obtain aluminum potassium sulfate with high purity and density;

(d) adding aluminum silicate and water to the aluminum potassium sulfate of the step (c) to produce alkali metal polysilicate-sulfate water salt chelate;

(e) polymerizing and precipitating the alkali metal polysilicate-sulfate water salt chelate at a low temperature to produce pectograph of aluminum silicate sieve;

(f) producing chelate by adding magnesia, iron oxide, calcium hydroxide, sodium oxide, potassium oxide, and distilled water in sequence;

(g) purifying and drying the chelate of the step (f) to produce dried microsphere;

(h) melting the dried microsphere of the step (g) at a high temperature, cooling, hardening, and mixing with diluted (thin) sulfuric acid;

(i) carrying out sequential treatments on the resultant of the step (h), that is, polymerizing, cleansing, heating, dehydrating, or drying, and performing vapor treatment, to obtain powder aluminum silicate molecular sieve with a high absorption of which particle size is under $1\mu$; and, (j) polymerizing the aluminum silicate molecular sieves with each other until they are matured to be a highly dense heel.

The steps (c) and (d) are similar to those of the above described method for manufacturing colloid aluminum silica gel. Likewise, the method can further comprise a step, in which the matured heel from the step (j) passes through an ion-exchange resin layer several times to produce very pure and consistent colloid aluminum silica gel, and later the consistent colloid is crushed.

A preferred surfactant containing colloid aluminum silica gel includes protecting colloid for ionizing strongly negative charges. The protecting colloid can be phycocolloid prepared by extract mucilage of brown seaweed in the ocean. The phycocolloid is one of botanical polysaccharides, and has a formula of $C_6H_{12}O_6$)n, in which D(+) mannose as a main component possesses more than 9 glycosidic linkage.

The surfactant containing colloid aluminum silica gel preferably contains a little amount of photocatalyst that exhibits electro deposit in a titer solution. The electro deposit photocatalyst is selected from a group consisting cadmium chloride having a formula, $Cd(ClO_4)_2 \cdot 26H_2O$, cyclic ether, e.g., tetrahydrofuran, and cadmium sulfide colloid active sieve that is prepared by mixing a long ring-chain alkanethiol with sulfured hydrogen and dehydration drying.

Still another object of the present invention is to provide a surfactant containing alkanol amide condensate obtained from a reaction of 12-hydroxy-cis-9-octadecanoic acid, alkanol amine and water.

The above 12-hydroxy-cis-9-octadecanoic acid is preferably botanical ricinoleic acid which is extracted from caster oil and has a formula $C_{18}H_{34}O_3$.

In addition, the surfactant containing the aforementioned alkaolamide condensate can have a little amount of photocatalyst that exhibits electro deposit in a titer solution. The electro deposit photocatalyst is selected from a group consisting cadmium chloride having a formula, $Cd(ClO_4)_2 \cdot 26H_2O$, cyclic ether, e.g., tetrahydrofuran, and cadmium sulfide colloid active sieve that is prepared by mixing a long ring-chain alkanethiol with sulfured hydrogen and dehydration drying.

Still another object of the present invention is to provide a surfactant that forms spherical monodisperse colloid micell, which contains a homogeneous mixture consisting of nonionic surfactant of iso octylphenoxy polyoxy ethylene ethanol, a kind of ester of polyhydric alcohol and fatty acids having a formula of $(CH_3)_3CCH_2C(CH_3)_2C_6H_4O(OC_2H_4O)_7(C_2H_4OH)$, a nonionic surfact of p-ert-octylphenoxy polyethoxy ethanol having a formula of $(CH_3)_3CCH_2C(CH_2)_3C_6H_4O(CH_2CH_2O)_xH$, an nonionic surfactant having a formula of $HOCH_2(CH_2CH_2O)_nCH_2OH$, polyoxy ethylene, and distilled water.

A preferred surfactant that can form spherical monodisperse collide micell contains a little amount of photocatalyst that exhibits electro deposit in a titer solution. The electro deposit photocatalyst is selected from a group consisting cadmium chloride having a formula, $Cd(ClO_4)_2 \cdot 26H_2O$, cyclic ether, e.g., tetrahydrofuran, and cadmium sulfide colloid active sieve that is prepared by mixing a long ring-chain alkanethiol with sulfured hydrogen and dehydration drying.

In short, the present invention provides a surfactant consisting of (1) 8 to 12 parts of colloid aluminum silica gel which has characteristics of both silica and alumina, being void of any chemical bond to form polymers by reacting with other molecules in an ecosystem, having a capacity of metal substitution of zeolite at a low temperature, and containing evenly purified colloid aluminum silica gel having the particle size within a range of from several nm to several $\mu$m of diameter; (2) 5 to 8 parts of alkanol amide condensate obtained from a reaction of 12-hydroxy-cis-9-octadecanoic acid, alkanol amine and water; (3) 3 to 3.5 parts of nonionic surfactant of iso octylphenoxy polyoxy ethylene ethanol, a kind of ester of polyhydric alcohol and fatty acids having a formula of $(CH_3)_3CCH_2C(CH_3)_2C_6H_4O(OC_2H_4O)_7(C_2H_4OH)$; (4) 2 to 2.3 parts of nonionic surfactant of p-tert-octylphenoxy polyethoxy ethanol having a formula of $(CH_3)_3CCH_2C(CH_2)_3C_6H_4O(CH_2CH_2O)_xH$; (5) 2.2 to 3 parts of phycolloid, one of botanical polysaccharides, having a chemical formula of $(C_6H_{12}O_6)n$ and D(+) mannose as a main component possesses more than 9 glycosidic linkage; and (6) 70.90 to 79.30 parts of distilled water.

Preferably, the above surfactant further comprises 0.5 to 0.8% of electro deposit photocatalyst. The electro deposit photocatalyst is selected from a group consisting cadmium chloride having a formula, $Cd(ClO_4)_2 \cdot 26H_2O$, cyclic ether, e.g., tetrahydrofuran, and cadmium sulfide colloid active sieve that is prepared by mixing a long ring-chain alkanethiol with sulfured hydrogen and dehydration drying. More preferably, 5 to 7 wt % of the final mixture of the surfactant can be further dehydrated at the end.

The compositions of the surfactant according to the present invention can be effectively used for removing oil or grease; regenerating land polluted by hydrocarbon compounds; suppressing or removing red tide; cleansing a ship, airplane or automobile; decomposing a serum or hemoglobin; cleansing a fisherboat equipment or fishing net; catching light water ions; decomposing dextrine (starch), protein or denatured forms of the same; deinking treatment of waste prints; scouring textile, pulp, or wool; removing bacteria or mold; removing odor; cleansing equipment associated with water and vapor circulation; ultrasonic cleansing of iron or nonferrous metals; washing fabrics or furs; washing glasses or ceramics; bathing fur animals; collecting dust; pressure cleaning; or removing nicotine.

Moreover, the surfactant of the present invention can be added to cements, and table adopting agent or diesel materials to form cleansing solvent emulsifiers.

In the meantime, the surfactant compositions of the present invention can be included to cutting oil or lube. Also, the surfactant compositions can be used for washing any table cloth in the field of food processing. Further, the surfactant compositions are very useful for cleansing denatured water-soluble pollutants, neutral oil pollutants or glass fatty acids pollutants as well as washing nylon, cotton or wool.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying Chemical Formulas. The matters defined in the description are nothing but the ones provided to assist in a comprehensive understanding of the invention. Also, well-known functions or constructions are not described in detail since they would obscure the invention in unnecessary detail.

Inventors of the present invention discovered that the conventional alkyl benzene sulfonate (ABS) and linear alkyl benzene sulfonate (LABS) detergents are not easily decomposed by microorganism in the water, or cause eutrophication, hindering self-cleansing of water, and are very poisonous to the environment in the water. In addition, most of the above detergents have an atom group, e.g., alkyl group or methyl group, in a side branch, or have benzene nuclei, so they had to go through a sulfate processing or a sulfonate processing, but still failed to exhibit sufficient cleansing capacities requiring a lot of extra additives for more efficient cleansing, which in turn resulted in serious pollution in both land and water.

The inventors then turned their interests to linear type detergents having fatty acid surfactants as base since they are known to be very safe for the ecosystem. Unfortunately, most of the fatty acid surfactants slowed down natural decomposition by microorganism and were seriously harmful for a human body. This discovery was known to the inventors by observing that those fatty acid surfactants are produced by adding ethylene oxide during a addition processing, or adding sulfuric acid or chloro sulfonic acid during an ester processing, so they naturally have an ethylene linkage in their condensate. The condensate then polymerize with other organic sieve in the ecosystem or initiate secondary addition reactions that consequently inhibit the decomposition by microorganism.

Therefore, as an attempt to solve the problems described above, the inventors first tried to produce a specific active colloidal particle that was prepared by sintering many kinds of inert inorganic compounds at a high temperature to remove any impurities and make purified colloidal particle. In this matter, they succeeded to decompose contaminated organic materials, and to promote reduction of atoms in organic materials through an absorption-separation, thereby securing ecosystem's safety. Further, the surfactant containing the above specific active colloidal particle had a greatly reduced harmful component compared to the conventional detergents. In result, the inventors succeeded to produce a new detergent for improving cleansing effect, and at the same time, being safe for a human and more safe and environmentally-friendly.

A method for manufacturing active components of collide according to the present invention is now explained in more detail by referring to the examples below, which are not intended to be limiting. Unless specified, the percentage indicates a percentage by weight. Invention conditions, for example, composition ratios or temperature ranges and so on, can be practiced by a person with an ordinary skill within the limit that the objective of the present invention is not changed.

Synthesis of Colloid Aluminum Silica Gel

To 25 wt % of sulfuric acid was dissolved aluminum hydroxide, $Al(OH)_2 \cdot xH_2O$ (molecular weight: 77.99), that consists of 21.02% of aluminum oxide ($Al_2O_3$), 41.65% of silicic acid ($SiO_2$), 5.48% of potassium ($K_2$), 2.70% of red iron oxide ($Fe_2O_3$), 20.85% of sulfuric acid ($H_2SO_4$), and 0.63% of water. Then, potassium sulfate ($K_2SO_4$) was added, and the mixture was stirred at a low temperature within a range of from 68° F. to 77° F. to produce soluble aluminum double salt, i.e., $K_2SO_4 \cdot Al_2(SO_4)_2 \cdot 24H_2O$. In order to remove any impurities in the compositions, the soluble aluminum chelate was continuously stirred at a temperature of 176 to 185° F., and an addition reaction was proceeded by slowly dropping 0.1% of enzyme, $(Na_2)_2CO$. In result, remaining impurities was greatly reduced, and high quality of potassium aluminum sulfate (potassium alum) with a high purity and density was obtained. The relevant chemical equation and products are illustrated below:

$$2Al(OH)_3 + 3H_2SO_4 \rightarrow Al_2(SO_4)_3 + 6H_2O$$

$$Al_2(SO_4)_3 + K_2SO_4 + 24H_2O \rightarrow K_2SO_4 \cdot Al_2(SO_4)_2 \cdot 24H$$

Here, the product was heated and condensed at 176° F., and transferred to a flask to be stirred and was cooled. Then, the compositions were put into a centrifuge to be subjected to dehydration processing, and a hot concentrator to be subjected to a heat condensation at a temperature of 140° F. for four hours. The compositions lost 18 molecules of hydrate and produced $SO_2$ instead. The product was decomposed as white anhydrous aluminum oxide and potassium sulfate to yield the material (specific gravity: 1.758, melting point: 110° C.) illustrated below:

$$K_2SO_4 \cdot Al_2(SO_4)_3 \rightarrow Al_2O_3 + 3SO_3 + K_2SO_4$$

Prior to the reaction, potassium alum ($K_2SO_4 \cdot Al_2(SO_4)_2 \cdot 24H_2O$) was mixed with aluminum silicate ($Al_2(SO_2)_4$) in a ration of 1:3 by weight, and added was water to compose 24 water salts ($24H_2O$) alkali metal polysilicate-sulfate chelate. The resulting mixture was slowly precipitated at a low temperature of 59° F. and produced pectograph of aluminum silicate sieve. Here, the pectograph indicates precipitated and dehydrated sol in colloid solution.

The pectograph of the aluminum silicate sieve consists of 53.95% of $SiO_2$, 1.02% of $Al_2O_3$, and 35.15% of $H_2O$, and the relevant reaction is illustrated below:

$$2Kal(SO_4)_2 \cdot 12H_2O + 3Na_2SiO_3 \leftrightarrows Al_2(SiO_3)_3 + 3Na_2SO_4 + 12H_2O$$

In order to improve absorption of the pectograph of the aluminum silicate sieve, 0.3% of light magnesia (MgO), 0.15% of iron oxide ($Fe_2O_3$), 3% of calcium hydroxide ($Ca(OH)_2$), 1.75% of sodium hydroxide (NaOH), 0.10% of potassium hydroxide (KOH), and 35% of distilled water were added and stirred in sequence to produce chelate. The chelate was put into a tank and impurities therein were removed using a cleaning filter. Then, the chelate was placed in a spray dryer, and contacted with hot air through a heated air valve having a temperature range of from 302° F. to 410° F., connected to a cylinder to produce dried microsphere. This dried microsphere was placed in a melting furnace and fused at a temperature within a range of from 1202° F. to 1562° F. The melted microsphere was then cooled and hardened. To this microsphere, diluted sulfuric acid was added to prepare highly absorptive sieve. The sieve was twice cleansed using 10% of ammonia solution ($NH_4OH$) to be neutralized, and heated at 140° F. to be dehydrated and dried. The dried sieve then went through a vapor treatment, and was crushed and powdered. Using a colloid mil, this powder formed sieve having a particle size less than 1 $\mu$m, and in result, highly absorptive aluminum silicate molecular sieve was obtained.

The aluminum silicate sieve was dissolved in distilled water having 2.5 times of the sieve by weight. To the solution, 25% of sodium hydroxide was added by weight of the distilled water. The mixture was vapor heated at a temperature within a range of from 158° F. to 284° F., and was matured. Through a polymerization processing around 140° F., the mixture was matured to heel with a high density. To this matured heel, slowly added was diluted sol for polymerizing precipitation, which was prepared by diluting sodium silicate ($Na_2O \cdot 3SiO_2 \cdot xH_2O$) that passed through a cation exchange resin layer. Again, the resultant passed through an anion and cation exchange resin layer in order to prepare highly pure and consistent colloidal silica gel. Therefore, using a colloid mill employed a corundum stone, the consistent aluminum silica gel was crushed, and sprayed at a high pressure using especially a colloid mill having the structure of air turbulent to be subjected to a turbulent diffusion processing. When the turbulent diffusion processing was completed, the aluminum silica gel was compressed on a screen with below minus 14 mesh to yield uniform aluminum silica gel. The final products, in other words, uniform microsphere colloidal active particles, which went through all the above processes, have characteristics both of silica and alumina and at a low temperature, and they possess complex functions of zeolite of alumina gel crystal. The colloidal active particles form a relatively uniform granularity having a particle size of a diameter within a range of from 1 micrometer to 1 nanometer. For the above particular case, the diameter of the colloid particles was 1 nm. Also, it was discovered that these activated colloidal particles retained molecular chaos due to strong free energy in a solution. The thermal energy, that is, brownian force, of the particles was measured as following:

(Applied force: $\alpha = 1$ $\mu$m, $\mu = 10^{-3}$ kg/ms, U=1 $\mu$m/s, $\rho = 10^3$ kg/m$^3$, $\Delta\rho/\rho = 10^{-2}$, g=10 m/s$^2$, Aeff=$10^{-2}$Nm, $\xi$=50 mV, $\epsilon = 10^2$)

Electrical force/Brownian force $ae o\xi^2 / KT \approx 10^2$

Attractive force/Brownian force Aeff/KT$\approx$1

Brownian force/Viscous force KT/$\mu$Ua$^2 \approx$1

Gravity/Viscous force $\alpha^3 \Delta Pg/\mu$Ua$\approx 10^{-1}$ Initial force/Viscous force $\mu a^2$ U$^2/\mu$Ua$\approx 10^{-6}$ wherein, wherein, $\alpha$ is length; K is Boltzmann constant (1.381×10$^{-23}$ J/K); T is absolute temperature; additivity (Van der Waal's force on an atom or a molecule generates between electron microscope body); 0(Aeff/a), Aeff is Hamaker constant, $aeo\xi^2$ is colume law, E is a dielectric constant of a fluid; EO is a dielectric constant in free space (8.88×10$^{-12}$ C/Vm), $\xi$ is an electron potential of a particle; U is viscous force on a particle moving with any velocity; 0($\mu\alpha$U) is a median value of viscosity; 0(a$^2$p$^2$U$^2$) is the law of inertia of Stockes; and, 0(a$^3 \Delta$Pg) is gravity on a particle.

Therefore, the above again confirms that the activated colloidal particle of the present invention exhibits thermodynamic activity in molecular chaos to be accordance with Brownian mathematical theory.

So far, any one has ever found a method for manufacturing multifunctional activated colloidal particles using a mixture of aluminum silicate, magnesia (MgO), iron oxide ($Fe_2O_3$), calcium hydroxide ($Ca(OH)_2$), sodium hydroxide (NaOH), and potassium hydroxide (KOH), and a surfactant using the same.

Synthesis of Alkanolamine Condensate Using 12-hydroxy-cis-9-octadecanoic acid, Alkanolamine and Water A homogenous compound was prepared by mixing botanical ricinoleic acid extracted from caster oil having a formula of $C_{16}H_{34}O_3$, equimolar amount to 1 mole of diethanolamine having a formula of $HN(CH_2CH_2OH)_2$, and the same amount of water. The produced slurry was distilled off at an atmospheric pressure at 175° C. to 180° C. to remove any remaining reactants and in result, consistent surfactants were obtained.

The inventors have been motivated ever since they found that the conventional fatty acid soft type detergents that had been developed as an alternative for petroleum type detergents were also stimulant to a human skin, and were not biodegradable fast enough so that they could not provide standard optimum conditions for decomposition by microorganism. Moreover, the fatty acid type detergents employ alkanolamide as a base component which causes an addition reaction with highly reactive ethylene oxide or ethylene chlorohydrine during an addition processing and produces ethylene adduct at a high temperature. This condensate was found to be very harmful to a human and became a malignant substrate forming polymers through an ethylene linkage with other organic substances in the ecological environment. In order to solve these problems, the inventors have developed a new surfactant functional substance that was produced without an addition processing wherein ethylene oxide or ethylene chlorohydrine was typically employed.

The chemical reaction equation for the aforementioned surfactant functional substance is illustrated below:

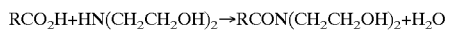

$RCO_2H + HN(CH_2CH_2OH)_2 \rightarrow RCON(CH_2CH_2OH)_2 + H_2O$

The surfactant functional material as described above was obtained by reacting fatty acids, that is, 12-hydroxy-cis-octadetanoic acid, with alkanolamine and water to induce an oxidation of a hydroxyl group (OH⁻). In result, the mixture produced water-soluble salts with an ability of a surfactant. Taking advantage of this characteristic, the inventors introduced a new detergent using the above material as a component, which no one has ever found before.

Synthesis of a Specific Surfactant for Forming Spherical Monodisperse Colloid Micell A homogeneous compound was prepared from a homogenizer by employing an nonionic surfactant of iso octylphenoxy polyoxy ethylene ethanol, a kind of ester of polyhydric alcohol and fatty acids having a formula of $(CH_3)_3CCH_2C(CH_3)_2C_6H_4O(OC_2H_4O)_7(C_2H_4OH)$; a nonionic surfactant of p-tert-octylphenoxy polyethoxy ethanol having a formula of $(CH_3)_3CCH_2C(CH_3)_3C_6H_4O(CH_2CH_2O)_xH$; an nonionic surfactant polyoxy ethylene having a formula of $HOCH_2(CH_2CH_2O)nCH_2OH$; and distilled water by several times of weight. The mixture was then sprayed at a high pressure to form microhallowsphere, and heated by vapor for controlling moisture therein, which consequently condenses the density of the mixture, to obtain a particular surfactant that can form spherical monodisperse colloid micell.

Synthesis of Phycocolloid With a High Purity and Consistency for Ionizing Strong Negative Charge The present invention provides a new form of protecting colloid.

A discovery has been made to an ascidiacea hormone in the ocean, i.e., male plant spermatia, which secretes particular kinds of metabolites and ionizes strong negative charge. A protecting colloid was made out of the mucilage of this hormone. The protecting colloid was known to stabilize the activities of unstable colloidal particles in an electrical field by helping the colloidal particles to be dissolved in a solution.

In consideration with that the polyaluminum silicate colloidal particles tend to be unstable in a solution, a protecting colloid with appropriate functions, especially stabilizing the colloidal particles, would be more than welcomed.

In order to manufacture the protecting colloid according to the present invention, first of all, a kind of alga, i.e., brown seaweed, which grows at a cold temperature in the deep sea was dried off through a natural seasoning in the shade within a temperature range of from 10° C. to 15° C. It was deposited in limewater to remove grease and impurities therein, and neutralized by reacting with an acid. Then, it was settled in the freshwater to be washed and was exposed to sunlight for manufacturing table-bagged seaweed. To this processed seaweed, water as much as 30 times by weight (wt %) and citric acid were added, and the mixture was heated at 212° C. to 284° C. to form a gel. Next, the resulted gel was put into a spray dryer having the construction of high pressure spray dryer system for controlling moisture therein, and again extruded to a screen with a mesh below −14. In this manner, the phycocolloid with a very high purity and consistency for ionizing strong negative charge was prepared.

The following are the physical properties of the phycocolloid:

mp: 132° C., den(g/cm³): $1539^{20}$, Solubility $(^n_d):H_2O$ 4 eth 1; bz1 thermodynamic properties: $\Delta_fH°/kJmol^{-1} = -1263.0$

<Chemical Structure of the Phycocolloid>

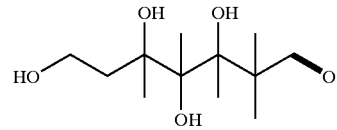

Synthesis of a Novel Surfactant

By combining the surfactants described above, the present invention provides a novel surfactant with activated colloidal particles. The new surfactant consists of 8 to 12 wt % of colloidal active particles made of polyaluminum silicate; 5 to 8 wt % of alkanolamide condensate; 3 to 3.5 wt % of iso octylphenoxy polyoxyethylene, a nonionic surfactant of an ester of polyhydric alcohols and fatty acids; 2 to 2.3 wt % of a nonionic surfactant, p-tert octylphenoxy polyethoxy ethanol; 2.2 to 3 wt % of natural phycocolloid extract; and, 70.90 to 79.30 wt % of distilled water.

The surfactant of the present invention is not harmful to a human and the ecosystem since it contains greatly reduced amount of chemicals that used to cause environmental problems. In other words, the surfactant where specific physical properties were added upon countervails the disadvantages of the conventional surfactant in washing ability. No one in the industries has not yet found this new surfactant having specific physical properties and improved washing ability despite reduction of chemical factors necessary for washing.

One might assume that if the surfactant of the invention is dispersed in the water, it might not readily dissolve in the water due to the long hydrocarbon chain therein originated from an ester linkage of long ring-chained fatty acids and glycerin of functional groups in the surfactant, that is, alkanolamide condensate molecules and nonionic surfactant molecules. However, since the surfactant of the invention has hydrophilic groups, e.g., —OH, —COOH, —NO₂, —NH₂, at the end of each molecule, it easily dispersed and ionized in the water. Thus, when the concentration of molecules exceeds a critical micelle concentration, the molecules form a stable and soluble unimolecular film. In addition, when the unstable activated colloidal particles aforementioned disperse in a surfactant solution at a greater concentration than that of a critical micell concenration, water molecules in the water bond with these particles on the surface, namely, the unstable activated colloidal particles are hydrated and become the surface of hydroxyl groups. This hydroxyl group bonds with H+in the water, such as, —OH+H→OH⁺₂, and molecules in the water change, such as, OH+OH⁻→O⁻+H₂O. Therefore, the unstable particles are absorbed to micell colloid of a surfactant, so free energy gets decreased and stabilized hydration can be maintained. At this time, the surfactant charge of colloidal particles in the solution is equivalent to charge of the opposite sign ion in the liquid, consequently forming an electric double layer around the particle. On the other hand, the phycocolloid extracted from a natural seaweed contains D+ mannose as a main component that has more than 9 of glycosidic bond, and is a kind of polysaccharides having botanical polysaccharide compound of a formula $(C_6H_{12}O_6)n$.

Accordingly, the detergent of the present invention are surfactant compositions with much improved consistency, absorption and ion exchange function, which consists of carbon, hydrogen and oxygen, and is composed of consistent colloidal particles having strong negative charge.

The phycocolloid is added into the cleansing liquid, or the detergent, containing colloidal particles prepared in the invention to ionize strong negative charge [ξ1, ξ2>K (electrolytic concentration of a solution), and to change zeta (ξ) potential of the dispersed colloidal particles so that the stable colloidal particles can be stabilized. Moreover, in the electrostatic field, the particles' brownian motion force gets much better and this consequently doubles the detergent's performance of shaking dirt on the laundry. Thus, the detergent containing physocolloid of the present invention has much improved washing ability, and further the colloidal particles therein are equipped with excellent electrolytic properties and absorption, so they are well prepared for buffing the separated dirt's re-precipitation.

The above described technology for building up electrolytic properties of strong negative charge around phycocolloid to help a surfactant perform washing much better by means of colloidal particles' organic supplement, wherein the particle has oxidation crystal structure of silicic acid and aluminum that are supplied as washing materials, has not yet been published.

When the surfactant of the present invention is dispersed in the water, the colloidal particles absorb surface charge and proceed very powerful random movement one another. Later, the particles directly intrude into dirt in order to separate oil, grease and earth from the laundry, and perform highly efficient and activated washing. In addition, the surfactant of the present invention, since it takes an advantage of physical properties of the activated colloidal particles to compensate a great amount of required builders in other detergents and surfactants in general, is more appropriate for protecting the ecosystem and maintaining environmentally-friendly safety. This washing mechanism of the invention is, therefore, very distinctive from operation mechanism of the conventional detergents.

Using water as a medium, the surfactant of the present invention allows the activated particles therein to perform particular physical and chemical functions. Wherever there is a certain amount of moisture for the particles to be activated, they perform excellent washing regardless of the kind or quality of water, such as, light water, fresh water, or salt water. Further, the surfactant by itself does not contain pollution and toxicity factors, e.g., phosphate, sulfate, nitrate, nitro triacetic acid (NTA), enzyme, corrosive agent and so on, and linkage for polymerization with other organic substances that are dissolved in the ecosystem. Thus, the surfactant easily captures light water ions, e.g., calcium ($Ca^{++}$), magnesium ($Ma^{++}$), iron ($Fe^{++}$) and so on, and does not create any precipitate in any kind of light water.

The surfactant of the present invention also contains a little amount of colloidal-active semiconductor particle as an electro deposit photocatalyst to form compatible micell in organic surrounding, so their mutual organic activity absorbs ultraviolet and transits ozone for a rapid decomposition in the water. In result, the surfactant causes a reaction between ozone and a photon, from which a highly reactive hydroxyl group for promoting photolysis is produced.

In other words, the photon induction of colloidal-active semiconductor particle produces photo-oxidation derivatives and further detoxicated hydroxyl groups, which react with non-reactive molecules in the solution for accelerating oxidation-reduction of organic substances.

In the meantime, the inventors found that the colloidal-active semiconductor particle as an electrro deposit photocatalyst can be used for preparing activated molecular sieve by preparing dehydrated and dried CdS sol, which is a mixture of approximately $10^4$M of cadmium chloride of a formula $Cd(ClO_4)_2 \cdot 26H_2O$, tetrahydraofuran ring type ether of a formula C6H8O, long ring-chain type alkanethiol (RSH), and sulfureted hydrogen. The physical properties of this CdS sol are now explained below.

Diffusion Data of CdS(Cadmium Sulfide) Sol Semiconductor

Frequency factor, D. ($cm^2$/s): $1.6*10^2$

Activation energy, Q (eV): 2.05

Temperature range (° C.): 800–900

Thermodynamic Measurement:

Molar enthalpy (heat) of formation at 298.15 K in K/mol: $\Delta_f H°/KJ\ mol^{-1}=-161.9$ Molar Gibbs energy of formation at 298.15 K in K/mol: $\Delta_f G°/KJ\ mol^{-1}=156.5$ Molar enthalpy at 298.15 K in J/mol K: $S°/J\ mol^{-1}\ K^{-1}=-64.9$ The photocatalyst CdS can have compatible colloidal-active particles in organic surrounding by a long chained alkanethion in tetrahydrofuran, and is prepared by cadmium ions together with $H_2S$ in the tetrahydrofuran. These particles exhibited a tendency to decrease in contrast to the increase of thiol. The mean diameter of CdS particles is influenced by the increase of thiol concentration, and is determined by the equation, i.e., log d=1.32–1.13 log c. In the equation, d(nm) indicates the mean diameter, and c(M) indicates thiol concentration.

The above cadmium sulfide colloidal sol forms a very strong binding with thiol on the surface to make thiol group containing sulfide ions for instance, and the stabilized cadmium sulfide by thiolate is very sensitive to ultraviolet in the solution and has light absorption fluoresce. Further, the CdS sol continues to organic activation with the dispersed colloidal particles, absorbs photos, transits and decomposes ozone, and makes highly reactive detoxicated hydroxyl group ($OH^-$) for photo-oxidation. Photo-oxidation of positive holes in CdS particles due to light absorption and electrons of thiolate anions and their oxidation—reduction, can explain the photolysis mechanism.

In this case, CdS particles that are stabilized by thiolate actively decompose ultraviolet into the solution as long as oxygen or ozone is present. Therefore, at the absence of oxygen or ozone, the CdS particles lose stabilizing group and cause agglomeration forming large particles, thereby deterring more efficient dispersion of the absorbed ultraviolet. This is probably because of the oxidation-reduction of the positive holes in CdS particles and the thiolate anions, which decreases thiolate chains and creates unstable surrounding for CdS colloidal particles. The elementary process thereof is as follows:

The light absorption agglomeration number, n, of a colloidal particle having one stabilized thiolate anion ($RS^-$) leads electron holes in pairs.

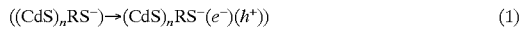

$$((CdS)_n RS^-) \rightarrow (CdS)_n RS^-(e^-)(h^+)) \quad (1)$$

The major reaction involves a re-bonding of carriers that are either radioactive or free of light-emission.

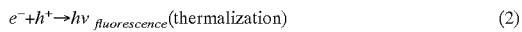

$$e^- + h^+ \rightarrow h\nu_{fluorescence}(\text{thermalization}) \quad (2)$$

This shows an oxidation of thiolate anions. Meanwhile, thiol radical is emitted from colloidal particles.

$$(CdS)_n RS^-(e^-)(h^+)) \rightarrow (CdS)_n e^- + RS^-) \quad (3)$$

The remainder of electrons can form cadmium metal and a dimer for forming either thiol radical or disulfide.

$$2(RS^-) \rightarrow (RS)_2 \quad (4)$$

An electron from another colloidal particle can stabilize the thiol radical that is produced by emission of colloidal particles.

$$(CdS)_n RS^-(e^-)) \rightarrow (CdS)_n) + RS^- \quad (5)$$

In this manner, a phytolysis experiment of CdS colloidal sol was conducted under various illumination times in the presence of oxygen, and absorption spectrum therefor was $\lambda > 329$ nm.

In the present invention, $Cd(ClO_4)_2 \cdot 26H_2O$ having $10^{-4}$ to $10^{-3}$ M was dissolved in tetrahydrofurane, later mixed with thiol, and to the mixture, $H_2S$ was injected through septum. Then, the solution was violently stirred. For the photolysis experiment, xenon lamps from various filters were employed. As for the eluent of HPLC (high pressure liquid chromatography), the mixing solution of $10^{-3}$ M of $Cd(ClO_4)_2 \cdot 26H_2O$, tetrafuran solution, and $10^{-2}$ M of thiol solution was used.

According to the measurements of the above experiment, absorption materials (5 $\mu$m) by chromatography were 500 $\lambda$ of nucleaosil for the first column and 1000 $\lambda$ of nucleosil for the second column. For the measurement of nucelosil without sulfureted hydrogen was 400 $\lambda$. The area of a column was 12 cm×4 mm. For the chromatography of the experiment, $1 \times 10^{-3}$ M of $Cd(ClO_4)_2 \cdot 26H_2O$ and $2 \times 10^{-4}$ M of $H_2S$ were added. Also, to the $H_2S$, various amounts of hexanethiol were additionally added. In an experiment as above, as the thiol concentration (thiol, C6H13SH) gets higher, photoluminiscent strip indicators for CdS colloid absorption spectrum transferred from yellow to blue, and colorless at the highest concentration. This phenomena confirms that light absorption of cadmium sulfide sol is proportional to thiol concentration because the particles therein become smaller due to the increased thiol concentration, being in a better position to absorb light. Therefore, disulfide was exhibited in a methyl silicon column of gas chromatography, and this is because of light absorption of CdS particles.

Although a starting point of absorption and a diameter of a particle were measure through diverse experiments using an extrapolation method, the operation of thiol exhibited a similar particle growth limit found in telermorization of polymer chemistry. Accordingly, the correlation factor between granularity of particle size and concentration of terminating agent is calculated from straight lines obtained by double logarithmic plot using a particle's diameter, d(Å), and thiol concentration ratio c(M) as follows:

Log d=$K_1$-$K_2$: wherein $K_1$ is 1.32 and $K_2$ is 0.13.

Similar measurements were obtained from didecanethiol, octacdecanethiol, and 1,9-nonanedithiol, which have the value of $K_1$ between 1.25 and 1.34 and that of $K_2$ between 0.12 and 0.14. This tendency again confirms that granularity of a particle decreases as thiol concentration increases according to HPLC (high pressure liquid chromatography). Therefore, large particles are only observed during the short elution of chromatography. The colloidal particle retained stability for several weeks, and the absorption and fluorescence thereof were not affected at all even reflux was done at 90° C. for several hours. In the meantime, if no oxygen was present, the degree of light absorption rapidly decreased by approximately 10%, and cadmium sol made of strong bonding of alkanethiols was dissolved in an organic material but showed no changes against heating at 90° C. in terms of the affinity in the organic medium. These kinds of phenomena could be obtained because thiol functional groups are very tightly bonded to colloidal particles. In other words, a $Cd^{2+}$ ion has a strong bonding with a thiolate anion. In contrary, in the presence of oxygen, according to the mechanism for decomposing photoanodic of CdS colloid, the CdS particles absorb ultraviolet to react with trapped hole where an eletron is captured to react with oxygen to produce $O_2$, and form highly reactive hydroxyl groups, deterring photo-oxidation. Here, the trapped hole is an anion of oxidized $S^-$ radical during a reaction with $O_2$ or $O_2^-$, in order to chemically form sulfite and finally sulfate ions.

The surfactant of the present invention very easily decomposes by microorganism even at a relatively low temperature. Thus, it is possible to accomplish the almost complete decomposition by microorganism within several days. The biodegradation rate was tested on the detergent of the present invention when used in the water of 20° C. In result, 33% of the detergent was decomposed within 24 hours, 82% in 5 days, and 98.5% in 7 days.

B.O.D. (Phenylazide method): 5 days, 81.250 mg/l, ultimate 136500 mg/l (K=0.104)

The above biodegradation rate exceeds the maximum standard value stipulated by Environmental Protection Agency (EPA) in the United States. Thus, there is high expectation on this new form of detergent from a viewpoint that it would make a great contribution to the protection of water resources.

The product of the present invention eliminates too much use of chemical compounds, but is capable of activating useful qualities of colloidal particles for the washing detergent. Thus, it aims to minimize effluent or wastewater due to the detergent, and further to completely eliminate any toxicity therein that harms underwater life.

Moreover, the product of the present invention can be commercialized in most of industries since it is applicable for both alkali and acid. Especially, hydrophobic colloid of the detergent according to the invention is formed of a long hydrocarbon tail and a polarized head, thus, if the concentration increases, micelle crystallizes as an aggregate. At this time, the hydrocarbon tail heads toward the inside of micell and the polarized part touches water.

More micells are built by interaction between hydrocarbon tails, and each micell replaces hydrophobic surrounding with hydrophilic surrounding. And, the hydrophilic solid obstacle around the micell often interrupts the aggregation.

Critical micellar concentration of the detergent solution of the present invention, or the concentration factor, is 0.08×$10^{-3}$, which is measured by table surface tension law at 25° C.

The typical micell of the surfactant of the invention has approximately 50–60 of soap molecules. Hence, the soap molecules in one micell are the ones that dissolve even considerably insoluble dirt in the solution by inviting them to the inside of the micell. Besides, the molecules easily dissolve oil-bearing compounds including organic substances, e.g., halogenated compound, MEK (methyl ethyl ketone), heptane and so forth, wax, complex alcohol, drinks like milk or juice, and substances that do not dissolve in other clear detergent solutions.

According to the surfactant of the present invention, the initial sol concentration having one minute of half life is $1.4 \times 10^9$ in the water, if no obstacles for assembly are allowed. The maximum of colloid of the surfactant is $5\times10^{-5}$ for a radius of a particle, and $1.4\times10^9$ of particles occupy 0.07% of space per cc.

In addition, particles of the surfactant of the present invention are usually electrically charge in sol and they are manifested through electrophoresis. Their physical operation is more like an electric phenomenon, but more interestingly, they dissolve substances that didn't dissolve in other kinds of detergent solutions, because the particles act more aggressively upon the hydrophillicity or affinity of water. A measurement on the potential of H+ and OH− is measuring potential ions against oxidized sol containing a lot of metals and particles like carbon that oxidized table surface although they do not seem to be oxidants on the table surface itself. The size of micell in the surfactant of the invention is approximately $10^{-5}$–$10^{-7}$ cm.

The present invention is now explained in more detail with reference to the accompanying examples. Unless specified otherwise, every percentage throughout the specification indicates the percentage by weight (wt %).

INVENTION EXAMPLES

Example 1

To optionally decided weight 25% of sulfuric acid ($H_2SO_4$) was dissolved aluminum hydroxide ($Al(OH)_3$ $xH_2O$, molecular weight:77.99) consisting of 21.03% of aluminum oxide ($Al_2O_3$), 41.65% of Silicic acid ($SiO_4$), 5.48% of potassium ($K_2$), 2.70% of red iron oxide ($Fe_2O_3$), 20.85% of sulfuric acid ($H_2SO_4$), and 0.63% of water. The resulting composition was mixed with potassium sulphate ($K_2SO_4$) to produce potassium alum. The potassium alum again was mixed with aluminum silicate by a mixing ratio of 1:3 and produced 24-water salt alkali metal polysilicate-sulfate chelate. By polymerizing precipitation, colloid sol having a construction of aluminum silicate molecular sieve was yielded. To this aluminum silicate molecular sieve colloid sol, 0.3% of light magnesia (MgO), 0.15% of iron oxide ($Fe_2O_3$), 3% of calcium hydroxide ($Ca(OH)_2$), 0.75% of sodium hydroxide (NaOH), 0.10% of potassium hydroxide (KOH), and 35% of distilled water were added in sequence stirring the mixture to produce the chelate. The chelate was put into a tank and impurities therein were removed using a cleaning filter. Then, the purified chelate was placed into a cylinder chamber of a spray dryer, and passed through a spray nozzle. The chelate, after passing through the spray nozzle, contacted with hot air through a heated air valve having a temperature range of from 302° F. to 410° F., connected to the cylinder to produce dried microsphere.

This dried microsphere was fused in a melting furnace with a temperature range of from 1562° F. to 1652° F. The melted microsphere was then cooled and hardened. To this microsphere, diluted sulfuric acid was added to prepare highly absorptive sieve. The sieve was twice cleansed using 10% of ammonia solution ($NH_4OH$) to be neutralized and heated at 176° F. to be dehydrated and dried. The dried sieve then went through a vapor treatment, and the particles therein were crushed. Using a colloid mil, this powder formed sieve with less than 1 $\mu$m for a particle size, and in result, highly absorptive aluminum silicate molecular sieve was obtained.

The prepared polyaluminum silicate sieve was dissolved in distilled water having 2.5 times of the sieve by weight. To the solution, 25% of sodium hydroxide (NaOH) was added by weight of the distilled water. The mixture was vapor heated at a temperature within a range of from 158° F. to 284° F., and was matured at 140° F. Through a polymerization processing, the mixture was matured to heel with a high density. To this matured heel, slowly added was diluted sol for polymerizing precipitation, which was prepared by diluting sodium silicate ($Na_2O.3SiO_2.xH_2O$) that passed through a positive ion exchange resin layer. Again, the resultant passed through an anion and cation exchange resin layer in order to prepare highly pure and consistent colloidal aluminum silica gel. The colloidal aluminum silica gel passed through a colloid mill employed a corundom stone, and was crushed and sprayed at a high pressure in a colloidal milling apparatus having the structure of air turbulent to be subjected to a turbulent diffusion processing. When the turbulent diffusion processing was completed, the aluminum silica gel was compressed on a tylor screen with below minus 14 mesh to yield purified uniform aluminum silica gel. The final products, in other words, uniform microsphere colloidal active particles, which went through all the above processes, have characteristics both of silica and alumina and at a low temperature. The colloidal active particles are composed of a relatively uniform granularity having a particle size of a diameter within a range of from 1 micronmeter to 1 nanometer.

In order to manufacture nonionic colloidal active detergent solution, a homogenizing compound was prepared and dehydrated within a range of 5% to 7%, wherein the homogenizing compound consists of 8 to 12 wt % of colloidal active particles made of the above polyaluminum silicate; 5 to 8 wt % of alkanolamide condensate, which was prepared by oxidation of caster oil extract, that is, botanical ricinoleic acid (12-hydroxy-cis-octadecanoic acid and diethanolamine; 3 wt % of iso octylphenoxy polyoxyethylene ethanol, a nonionic surfactant of an ester of polyhydric alcohols and fatty acids; 3 wt % of $(CH_3)_3CCH_2C(CH_3)_2C_6H_4O(OC_2H_4O)_7(C_2H_4OH)$, 2 to 2.3 wt % of surfactant, p-tert octylphenoxy polyethoxy ethanol, $(CH_3)_3CCH_2C(CH_2)_3C_6H_4O(CH_2CH_2O)_xH$; 2.2 to 2.8 wt % of natural phycocolloid extract containing D+ mannose as a main component that has more than 9 glycosidic bonds; 0.5 to 0.8 wt % of CdS colloidal semiconductors; and, 70.90 to 79.30 wt % of distilled water. H.L.B. of the homogenizing compound is 15.8.

Following are the physical properties of the detergent aforementioned:

Appearance and Odor: a greenish and amber color liquid with a little of consistency and smell (510 mu dominant wavelength)

Specific gravity: 1.257 at 20° C.

Boiling point: 212° F.

Evaporation rate: >1 (butyl acetate=1)

Vapor pressure: 17.0 mmHg at 20° C., 22 mmHg at 25° C.

Vapor density: 1.3 (air=1)

Density: 8.5 lbs/gallon

Freezing point: −13° C. (55.4° F.)

Fresh point: None (APHA tristimulu procedure)

Viscosity: 120 centipoise at 20° C.

pH: 9.5±0.5 (adjusted by monoethanol amine)

Conductivity: 0.034 mhos/cm$^2$

Surface tension: 29.3 dyne/cm

Solubility in water at 15° C.:

Less than 0.5 parts per thousand salinity: completely dissolved 30 parts per thousand salinity: completely dissolved Decomposition: decomposed without combustion at 231° C.

Example 2

A test was carried out on the harmfulness or toxicity of the product of Example 1 when it was applied to a human body, and the following are the results thereof.

1) Acute Dermal Toxicity Test:

A skin external remedy was applied to 5 male rabbits and 5 female rabbits to an amount of 2 g/kg body weight. After 14 days of observation period, none of rabbits was dead. Instead, precisely $LD_{50}$ was observed to be higher than 2 g/kg body weight. Therefore, the product of the Example 1 was proved not to have any toxicity due to a skin external remedy according to FHSA/CPSC Regulation.

2) Dermal Irritation Test:

To a cut region of each 6 albino rabbits, 0.5 g of the Product was applied, one control group for the shielded skin region and other for the unshielded skin region. The test region was shielded and the substance for a test was in contact with skin for 24 hours straight. According to FHSA/CPS Regulation, it was found that the product of the Example 1 was not a primary skin stimulant.

3) Primary Eye Irritation Test:

The product was diluted in water at a ratio of 1:35, and was applied to one eye of each 6 albino rabbits. The observation was made in 24 hours, 48 hours, and 72 hours, respectively. The eye where the sample was applied showed no sign of irritation. Therefore, according to FHSA/CPS Regulation, it was found that the product of the Example 1 was not an eye stimulant.

4) Acute Oral Toxicity Test:

The product was injected through a tube to 5 male rabbits and 5 female rabbits to an amount of 5 g/kg body weight. After 14 days of observation period, none of rabbits was dead. Instead, precisely $LD_{50}$ was observed to be higher than 5 g/kg body weight. Therefore, the product of the Example 1 was proved not to have any toxicity due to an oral administration, according to FHSA/CPSC Regulation.

5) Acute Inhalation Toxicity Test:

5 male and 5 female rabbits were allowed to inhale the product with 25% solution of 20 mg/L of air as a nominal concentration. It was observed that in the 25% solution, precisely $LD_{50}$ was higher than the nominal concentration, 20 mg/L of air, for one hour. At the end of one hour, when the rabbits got loosed from the chamber, every one of them was alive, that is, for 14-observation period. Therefore, according to FHSA/CPSC Regulation, the product (25% solution) was not toxic due to inhalation.

6) Hazardous Gases Produced on Combustion: None

7) Chronicity Possibility: It Was Not Observed.

Example 3

Toxicity test on a waterfowl

The produce of the Example was orally applied to a waterfowl in accordance with the following method:

10 of Mallard-Hybrid male ducts weighing 3.2 lbs to 3.8 lbs, the undiluted product of the Example 1 was injected through a digestive tube. After the injection, the ducks were allowed to drink water and have some food for further experiment.

TABLE 1

| | Group 1 | | | |
|---|---|---|---|---|
| Survived Ducks | 10/10 | 10/10 | 10/10 | 10/10 |
| Controls (Distilled water) | 2/2 | 2/2 | 2/2 | 2/2 |

The ducks of Group 1 threw up 1% of the original product of the Example 1 within 15 minutes. Later, the ducks threw up the product to the amount of approximately 30 to 35% of the total injection amount.

TABLE 2

| | Group 2 | | | |
|---|---|---|---|---|
| Survived Ducks | 10/10 | 10/10 | 10/10 | 10/10 |
| Controls | 2/2 | 2/2 | 2/2 | 2/2 |

To 10 ducks of group 1, 13 ml of the product of Example 1 was orally administrated. Meanwhile, to the 10 ducks of group 2, 13 ml of the diluted product of Example 1 at a ratio of 1:30 was orally administrated. Within one hour from administration, the ducks drank water and had foods that were previously arranged, and they all seemed to be normal. This normal state maintained during the whole experiment period, showing no sign of harmfulness.

Especially, the 10 ducks of group 2 didn't throw up the product. As described above, they had water and foods as usual even after the administration, and no harmfulness was observed during the present experiment.

After the ministration, the ducks were observed three times every day. One duck from each group 1 and 2, respectively, was optionally selected. When a duck from the controlling group who had only water was anatomized, no change was observed in organs and tissues in associated with the product of Example 1.

Example 4

Micro-organisms Test of Product Obtained by Example 1

To saline water was mixed the high density diluted product of example 1 (hereinafter referring to "product") to prepare sample solutions as listed in Table 3 (hereinafter referring to "sample solutions"). Sample's density cited in Table 3 means mg of the product added in the sample solution per liter of the final testing system, and 100 g of the product was mixed in the sample solution.

To 150 ml of each sample solution was added 30 artemia sailina nauplii and same number of the fishes in 150 ml of pure salt water was prepared as a comparing control.

TABLE 3

| | Numbers Survived | | |
|---|---|---|---|
| Density of sample solution | 24 hours after starting test | 48 hours | Percent (numbers survied/total numbers %) |
| 739 mg/liter | 23/25 | 21 | 84 |
| 554 mg/liter | 25/25 | 25/25 | 100 |
| 416 mg/liter | 25/25 | 24/25 | 96 |
| 312 mg/liter | 25/25 | 22/25 | 88 |

TABLE 3-continued

Numbers Survived

| Density of sample solution | 24 hours after starting test | 48 hours | Percent (numbers survied/total numbers %) |
|---|---|---|---|
| 231 mg/liter | 25/25 | 24/25 | 96 |
| Control | 25/25 | 24/25 | 96 |

*sample solutions should be maintained at 20° C.

Artemia sailian nauplii obtainable from Nippon Goldfish in San Francisco, Calif. was used in the present invention.

The results of observation for the test under the above condition is given in Table 3 above.

Conclusion

It is understood that high percentage of the fishes survived is because of its infinite $TL_{50}$ at the density of sample solution adopted.

References a) Standard methods for the Examination of Water and Waste Water, $12^{th}$ Edition.

b) Evaluation of oil Spill Agents, Development of Testing Procedures and Criteria of the California States Waste Resource Control Board.

Safety Test for Fishes

To saline water was mixed the high density diluted product of example 1 to prepare sample solutions as listed in Table 4. Each of the sample solutions was prepared by diluting 100 g of the product with 300 g of water.

To individual aquarium 60 sticklebacks being placed was added with each of the sample solutions with the corresponding density listed in Table 4 below. The results of measurement for survival are given in the same table.

TABLE 4

Numbers survived

| Density of sample solution | 24 hour after starting test | 48 hour | 96 hour |
|---|---|---|---|
| 739 mg/liter | 20/60 | 19/60 | 17/60 |
| 554 mg/liter | 25/60 | 22/60 | 20/60 |
| 416 mg/liter | 35/60 | 32/60 | 29/60 |
| 312 mg/liter | 26/60 | 23/60 | 20/60 |
| 231 mg/liter | 36/60 | 33/60 | 31/60 |
| Control | 60/60 | 59/60 | 58/60 |

Fishes survived 96 hours after being treated were moved into a fresh salt water without additives and, except 3 fishes dead during transferring, all of them were still survived for several days.

Goldfish Safety Test

To fresh water was mixed the high density diluted product of example 1 to prepare sample solutions as listed in Table 5 below. The high density product means the product prepared by adding 100 g of the product obtained by example 1 in 300 g of water.

To individual aquarium 40 golden shiners being placed was added with each of the sample solutions with the corresponding density listed in Table 5. The results of measurement for survival are given in the same table.

TABLE 5

Numbers survived

| Density of sample solution | 24 hour after starting test | 48 hour | 96 hour |
|---|---|---|---|
| 739 mg/liter | 20/60 | 19/60 | 17/60 |
| 554 mg/liter | 25/60 | 22/60 | 20/60 |
| 416 mg/liter | 35/60 | 32/60 | 29/60 |
| 312 mg/liter | 26/60 | 23/60 | 20/60 |
| 231 mg/liter | 36/60 | 33/60 | 31/60 |

Example 5

Oil Dispersion Test (Performance Effectiveness)

A diluted solution was prepared by placing the product of example 1 into 3 times the amount of water. AS test oil, fuel oils No. 6 and No. 2 examined by California Water Resource Control Branch(CWRCB) were used in the present invention.

To 25 ml of either of said oils was added 5 ml of each of the diluted solutions and the resultant product being sufficiently agitated. The results of measurement for 6 times repeated tests were shown in both of Tables 6 and 7 below.

TABLE 6

Fuel Oil No. 6 (dispersion %)

| Example No. | Gms | 10 minutes | 2 hours | 6 hours |
|---|---|---|---|---|
| 1 | 30 | 39.5% | 40.2% | 59.8% |
| 2 | 30 | 45.3% | 53.5% | 63.0% |
| 3 | 30 | 45.3% | 51.1% | 63.8% |
| 4 | 30 | 38.2% | 48.7% | 60.4% |
| 5 | 30 | 40.3% | 42.3% | 55.4% |
| 6 | 30 | 41.8% | 42.2% | 53.2% |
| mean | 30 | 41.7% | 46.3% | 59.27% |

For Table 6, the percentage of dispersion was determined by means of a DU spectrophotometer indicating a monitoring range of 685–715 nm.

TABLE 7

Fuel Oil No. 7 (dispersion %)

| Example No. | Gms | 10 minutes | 2 hours | 6 hours |
|---|---|---|---|---|
| 1 | 30 | 65.7% | 67.3% | 65.74% |
| 2 | 30 | 63.8% | 67.8% | 65.9% |
| 3 | 30 | 64.3% | 65.2% | 64.9% |
| 4 | 30 | 65.8% | 66.2% | 65.8% |
| 5 | 30 | 65.3% | 68.9% | 76.2% |
| 6 | 30 | 65.2% | 67.4% | 73.6% |
| mean | 30 | 65.0% | 67.1% | 68.6% |

For Table 7, the percentage of dispersion was determined by means of another DU spectrophotometer indicating a monitoring range of 325–355 nm.

Example 6

In order to examine the efficiency of example 1, 10 g of fuel oil was added to about 1 liter of water. Afterward, the product of example 1 was added dropwise to the resultant solution. During dropping every drop, the solution was sufficiently agitated to support emulsion at a point the tyndall effect beginning to be appeared. The solution was continuously stirred until striation thereof was disappeared. It was supposed and determined that the point of starting tyndall effect to be appeared is when the dissolution process is completed. The test was repeatedly for 6 times and showed the results with 2% of deviation.

As a result;

1) dispersion of fuel oil No. 2 (10 g); 2 ml of the product from example 1 was required.

2) dispersion of fuel oil No. 6 (10 g); 1 ml of the product from example 1 was required.

3) less than 0.5 parts of product per 1000 salt was completely dissolved at 15° C.

4) 30 parts of product per 1000 salt was completely dissolved at 15° C.

Example 7

Soil contaminated by perchloro ethylene, methylethyl ketone, heptane, logh-chain hydrocarbons, oil, gas oil and diesel fuel was under reclamation by applying the product of example 1 to the soil. It is understood that the present inventive product is very effective to wash and clean the contaminated soil with such as hydrocarbons as the product was provided in an amount of 2 barrels to 20×60 yards$^2$ of area and having 1 ft of depth.

As a result, it has been expected that if about 1 drum(55 gallons) of product as diluted with 154 gallons is used, 20 yards $^2$ of area contaminated can be reclaimed.

The result obtained is as follows;

Soil Reclamation test: ERA helicopter, Juneau, Ak.

Condition: Extremely bad soil-natured and very severely contaminated soil with diesel oil Degree of contamination: EPH 5890 ppm Result of treatment: EPH 30.8 ppm Target value: EPH 1000 ppm BTEX value: not detected Treatment method: washing EPH: Extractable Petroleum Hydrocarbons BETX: Total Volatile Aromatic Organics From the measurement result of this test, it is evident by detecting the residual contamination degree that the present inventive product of example 1 has superior efficiency to wash and clean soil contaminated with hydrocarbons.

Example 8

Effect to contribute reclamation and environmental treatment of soil (soil remedial and cleaning)

Soil contaminated by hydrocarbon compounds was treated by spray-spreading the diluted product of example 1 with desired density on surface of the soil. After the treatment, capillary tubes in the soil were changed into air tubes. As the temperature variation of soil treated by the product was determined, it was found that the temperature measured 1 ft under the soil kept a range of 7–10° F. This is 1–1.5° F. higher than the temperature of adjacent soil not treated by the product. Consequently, such variation of temperature shows that the product flow into said air tubes actively is under active oxidation with cations of the soil.

Example 9

Structured Deactivation Technology of Hydrocarbons

Overview of structured deactivation technology in connection with the product of example 1 which illustrates the decomposition treatment of long-chain hydrocarbons into inert structured components is described as follows;

1) A first structural feature to emulsify hydrocarbons under natural environment of such as water or soil; the product of example 1 comprising alumina silicate containing CdS sol is produced by synthesizing surfactants in a complex form and designed as a structure to accomplish powerful emulsification between water/oil and oil/water at relatively low temperature. Therefore, as one of original structure features possible to emulsify such as physical property, the product is composed of submicron granules having a particle unit ranged of $10^{-5}$–$10^{-7}$ cm to easily break molecular binding rings of organisms comprising hydrocarbons, thereby, to emulsify and disperse the organisms into submicron granules, compared with other existing surfactants or emulsifying agents. Accordingly, it has been found that the inventive product can produce emulsion having large surface area.

Therefore, when measured emulsified oil particles by JELC CX-100 TEM (transmission electron microscope) operating at 12 kV to analyze particle unit thereof, it has been found that crude oil generally has HLB 4–14, while HLB 11–13.5 for lighter crude oil and HLB 15.8 for heavy oil. Accordingly, it will be understood that the present inventive product having an inherent HLB of 15.8 comprises a theoretically possible structure to actively emulsify and disperse petroleum compounds containing general fossil fuel oil with long-chain hydrocarbons.

It was evident that emulsoid produced by the present inventive product has less than 1 $\mu$m of particle unit, which is compared with emulsoid having around 100 $\mu$m by using conventional emulsifying agent. This means that the present product is an acceptor capable of emulsifying petroleum compounds with particle unit much smaller than by known emulsifying agent.

2) A second structural feature to act as a cellular shield to apply the activity of alumina silica particles; the product immediately react with hydrocarbons to emulsify oil particles insoluble to water in a short time and to remove the inherent ability of oil.

The cellular shield formed by alumina silica is defined as a kind of porous adsorbent having either of the structural features, one of which is amorphous to form honey comb and the other being complex porosity maze.

The internal structure of the alumina silica cell is composed of a specified material to allow the decomposed hydrocarbons and the like to be adsorbed inside trapping holes having uniform porous maze to separate and accept the hydrocarbons in order to prevent leaching of them into surrounding environment.

The product was observed as an alumina silica cell substrate having cellular shield structure, when optically analyzed for its structural form and determined by Transmission electron microscope(TEM). These particles are, in principle, $Al_2SiO_2$ cadmium particles and have trace of additional ions such as mannose and potassium sulfide. Further, it has also demonstrated by other manners such as SEM analysis, energy dispersion X-ray analysis and spectrophotometry method that the inventive product is constructed of alumina silica and CdS sol having a particle unit of about $10^{-5}$ $\mu$m with large surface area.

Example 10

When spaying the product of example 1 diluted in 20–40 times (% by weight) of water onto oil, the oil particles is emulsified and dispersed in a form of supermicron particles.

It has been found that hydrocarbons adsorbed into trapping holes of the product can absorb oxygen in UV and atmosphere, transfer ozone to prompt photo-oxidation and activate biodegradable decomposition of emulsified oil particles because of inherent characteristics owned by such product.

A mixture of 33.7% Bentonite of $(Al_2Fe_{1.67}Mg_{0.45})Si_4O_{10}$ $(Na^+,Ca^{++}0.38)$ containing montmorillinoite, 2.3% magnesium sulfate and 45.5% water was heated at 320–356° F. to evaporate waver, then, the resultant material having porous bead particles of 24 mesh entraped Cyst versus motil cells as toxic component of red tide(HAB) to prevent or inhibit the propagation of dinoflagellates derived therewith, when spreading to HAB derived sea.

Example 11

The product of example 1 diluted with 20–40 times % by weight of water was spread to surface of the sea covered with petroleum oil around open sea area. After the treatment, oil particles were immediately emulsified to loss their own feature. The resulting oil film was converted into water-soluble material and rapidly dispersed over the sea with the help of wind and tide, and finally disappeared by means of elemental reduction caused by biodegradable decomposition. It is understood that the diluent whether fresh water or salt water shows the same effect and, in the process of spreading the product by a sprinkler ship, the propeller strongly agitates the product spread on oil layer to assist the emulsifying and dispersion effect and to prevent the emulsified oil particles to be combined each other.

By such treatment, the glittering of oil layer suspended on surface of the sea was completely eliminated when the product was repeatedly spread 3 times while reducing its density and rotating the ship from outer periphery side toward inside until the oil layer was fully emulsified. In addition, it was evident not to cause precipitation of oil particles which were emulsified onto surface of the sea.

The spreader(or sprayer) equipped to the sprinkler ship used in the present invention was DUPLEX FORM PROPERTIMER.

The product of example 1 was used in an amount of 8 gallons as a diluted solution with 16 gallons of sea water. As a result of this practical experiment, it has been found that such product spread and agitated under 90–120 psi can emulsify and disperse about 70 gallons of bunker C oil. The sample taken was evident to be biologically and absolutely decomposed and disappeared 101 days after the treatment, in the presence of oxygen. The product of example 1 showed most efficiency when it was in a diluted state with desired times rather than not diluted state.

Consequently, it will be expected that the material and dilution times of the present product to provide optimum effect are dependent on wind and tide conditions and thickness of spread oil layer and the like, and should be appropriately controlled within a desired range of dilution.

Example 12

A solution prepared by diluting the product of example 1 in 20 times of water was effectively used to wash and clean main engine and other auxiliary machineries stained with oil. Also, another solution diluted in 50 times of water serves as a beneficial remover of residual and/or dregs deposited to engine room in a ship, exhaust gas or smoke residual.

If materials such as iron or steel are settled in a sedimentation tank containing the product of example 1 diluted in 5 times of water, light rust on the iron or steel could be easily removed, the resident time thereof being controlled depending on the degree of contamination.

The product is still effective to eliminate or clean mold on rope, sail, interiors, bilge (or keel-blocks) and so on.

Example 13

By using spinner head lowering into tank, small amount of the solution was sufficiently sprayed onto oil surface with a compression pump enough to cover the entire surface of the oil area and stood for 1 hour to allow the diluted product to be fully absorbed into the oil, thereby, to obtain maximum efficiency thereof. Subsequently, with 40 times low density diluted solution, the inside of the tank was washed then pumped outward. The stand time of 1 is required to form a butter-worth system of oil particles over about 30 minutes. The washed inner wall of the tank is wholly wet and means the completion of removal of oil. At this time, if gas is generated inside the tank and a diluted solution composed of the product of example 1 in 20 times of water is sprayed into the tank, it forms gas.

As a result of this example, it has been found that the present inventive product is very effective to reduce and remove crude oil or other petroleum material from the inside of storage tank and tanker around engine room and boiler of ship.

Example 14

A solution was prepared by diluting 8 gallons of the product from example 1 in 80–100 gallons of water. The solution was filled in the bilge of a ship to completely eliminate oil residual of the bilge. It is demonstrated that the solution effectively prevents corrosion and removes bad odor caused by the oil residual.

Practically, in case of the ship at sea, rolling of hull shakes the solution enough to wash the bilge. However, in order to assist the solution to absorb oil particles the solution must spray under high pressure. If the product entirely absorb oil particles, it generates emulsification state not to form oil layer.

Example 15

A solution was prepared by diluting the product from example 1 in 60–80 times of water. In this solution placed were working apparatus of ship or fishing net to remove fishy smell and provide washing effect. As a result, it is demonstrated that the present inventive product has high-performance to remove bad odor including fishy smell and to decompose serum and hemoglobin component.

Example 16

The present inventive product was effectively used in a deinking process of used paper including printed news paper and in a scouring process of pulp fiber.

In the scouring process, the product is blending with the pulp fiber in 1–6% by weight (0.2–0.33% based on weight of pulp fiber).

The product is added to 94–99% water to form a crushed slurry. The slurry is under heating at 32–82° C. to efficiently carry out deinking process of paper and/or scouring of pulp fiber.

In a preferred embodiment of the present application, it is most important to precipitate the printed paper in a precipitation solution after it was primarily settled into the solution comprising said product. Additionally, the crushing process should be carried out within the precipitation solution so that it accomplishes higher efficiency in the deinking process of paper and/or scouring of pulp fiber.

As sufficient amount of peroxide was added to the slurry to make it in pH 9–10, it was demonstrated that the slurry has simultaneously bleaching ability. Water used in this example whatever hard water or soft water showed a beneficial feature of not changing sensibility thereof caused by the water quality.

Also, when limited amount of peroxide was added, it was appreciated that the corrosive chemicals such as caustic soda needed not to be added compatible with that.

Contrary to other known pre-treatment in the deinking process requiring addition of excessive caustic soda, the present inventive product has superior efficiency in the deinking and scouring processes to prevent yellowing discoloration or lowering of quality of fiber.

The deinking process of the present invention utilized conventional pulp washer and was performed in the following procedures:

Crushed paper was introduced into a settlement bath containing 0.33% (by weight) of the product from example 1. The paper was under a crushing process at 80 to form thickened pulp slurry, then transferred into a washing screen to primarily wash it. Afterward, the washed slurry was moving into a defibering equipment. The defibering equipment kept its temperature at 60° C. and contained a water-soluble solution having an activity of 0.33%, which was composed of the first washed waste water and a fresh water by half and half and added with said product. That is, half the total amount of waste water can be reused.

By such treatment procedure, the pulp slurry generated from the third washing process with the secondary waster water could be rinsed by fresh water.

Such a series of deinking processes are accomplished by keeping the slurry and temperature conditions to be under a constant state and applied to existing manufacturing installation such as the production of face flyes of the wall using 100% used papers.

Therefore, it will be appreciated that front liner of gypsum board is able to economically produce wall board liner clear and brighter than by manilla lined

Example 17

This example relates the application of the product from example 1 to clean and wash outer side of aircrafts.

According to the specification CDS #1 in relation to the cleaning of aircrafts defined by Douglas Co., U.S.A., it was performed by ASTM (American Standard Testing Method) as follows:

1) Based on the specification CDS# Spec per Para/G-1 in relation to the cleaning of aircrafts defined by Douglas Co., said product as 35 times diluted solution was measured according to ASTM, F502. The results demonstrated that reduction of paint hardness, discoloration or stains were not present.

2) Based on the specification CDS# Spec per Para/G-2 defined by Douglas Co., said product was measured according to ASTM, F485. The results demonstrated that residuals or stains were not present.

3) Based on the specification CDS# Spec per Para/G-3 defined by Douglas Co., said product used in the washing of connecting parts in aircraft made of aluminum alloy was measured according to ASTM for Sandwich Corrosion Test. The results demonstrated that corrosion thereof was not present.

4) Based on the specification CDS# Spec per Para/G-4 defined by Douglas Co., said product used in the washing of acrylic plastic parts in aircraft was measured according to ASTM F484 for Stress Crasing on Acrylic Plastic Test. The results demonstrated that cracks or other damages at a stress level of 4,500 psi per in$^2$ were not observed.

5) Based on the specification CDS# Spec per Para/G-6 for cadmium removal test in the washing of aircrafts defined by Douglas Co., specimen of low-hydrogen embrittlement cadmium plated steel was taken for the cadmium removal test. The results demonstrated that reduction of cadmium content in weight was not observed.

6) Both of the product of example 1 not diluted and a diluted solution of said product in 30 times of water were measured in liquid precipitation test for hydrogen embrittlement characteristics caused by the washing of aircraft. The result of the original product demonstrated under the requirement condition below that.

On the contrary, the diluted solution demonstrated that no hydrogen embrittlement was observed in every part of the aircraft.

Therefore, it is understood that the present inventive product of example 1 does not derive fatigue crystallization of metal due to hydrogen embrittlement.

Standard for determination $$HP_{tc} = \frac{\text{Test } HP \text{ solution} \times 100}{\text{Calibration } HP} \leq 1$$

Example 18

The product of example 1 showed high efficiency of washing when it was used in the compression washing process.

In order to obtain optimum results, said product was diluted with 20–40 times of water. The product was spraying by an apparatus equipped with 20° Vee Jet type nozzle for injecting 2–3 gallons per minute at a pressure range of 500–550 lbs.

In the injection washing process under pressure, amount of water added to said product for diluting it varies within 20–40 times said product depending on desired concentration of the diluted solutions according to their applications. The concentration of solution can be controlled dependent on degree of contamination. Further, it has been found that when the nozzle of the apparatus is spaced at 8 inch interval from surface of the object to be washed and injects at 45°, the greatest results were obtained.

Example 19

The product of example 1 diluted in 5–15 times of water can remove grease.

Dependent on degree of contamination, the dilution ratio of product in water can be varied within 5–10 times.

The diluted solution was applied to effectively remove grease by rubbing it with brush on the grease, spraying 5 times diluted solution or by means of liquid precipitation process. Particularly, in case of severely hardened grease, an emulsifying agent prepared by blending said product, water and kerosene, hydrocarbon base solvent, diesel fuel or standard solvent in a ratio of 1:3:5 by parts is preferably used.

Example 20

Mold was effectively removed by injecting a diluted solution of the product from example 1 in 40–60 times of water at 30–40° C. under high pressure.

Said product can reduce bad odor, prevent transfer of nutrients needed for generating enzymes, thereby, to remove bacteria and trace materials growing germs, molds or fungi necessary to enzyme reaction. More particularly, it was discovered that said product has a performance to inhibit or control enzyme generation since trace of bacteria particles are adsorbed, entrapped into trapping holes having dead ended maze structure of colloidal particles in said product and films are formed to block the nutrient transferring materials.

Accordingly, it will be appreciated that said product with such functional characteristics can replace the prior known chemicals such as bactericides of quarternary ammonium in the sanitary washing process for machinery, apparatus and installation and packaging materials used in general food industry, and used as a safe detergent in various applications.

Example 21

In a hand-washing test for automobile, a solution of the product of example 1 diluted with 80–100 times of water can be preferably used to wash outer side of an automobile by rubbing with a soft linen cloth wet by said solution and rinsing with water, without causing skin stimulation or de-fatting or de-greasing affect. In particular, in case of such as engine parts of truck or automobile needed to wash by hand, a diluted solution in 5 times of water is spraying on the engine, then, the engine standing for 20 minutes and being washed with water to clearly remove oil inside the engine and grease, and other contaminants.

In case of washing radiator in a small automobile, 1 cup of the present product was introduced into the radiator. After driving the car driven for 1 week, used water of the radiator was discarded and fresh water was filled together with ½ cup of said product into the radiator. Additionally, in order to buffer the electrolysis, a little amount (about ½ tea spoon) of sodium bicarbonate of $NaHCO_3$ was added to the radiator. By this test, it has been found that the present product can prevent clogging of the radiator and perform additional functions to increase cooling ability thereof.

Therefore, in case of large cars (truck or bus) three-quarters of the present product was added to circulation water and, after driving the car for one day, used water was discarded and fresh water was filled into the radiator, as well as addition of 3 ounces of said product to maintain clean circulation water.

Accordingly, it is possible to eliminate confused washing process of the radiator carried out under stopping condition for 4 hours due to clogging of the radiator and to reduce cost per time. In this case, one ts(tea spoon) amount of sodium bicarbonate must be added to the product to prevent electrolysis.

Alternatively, an emulsifying agent prepared by blending said product, water and one selected from kerosene, hydrocarbon base solvent, diesel fuel or standard solvent in a ratio of 1:3:5 by parts is preferably used to much effectively wash grease film coated on surface of a new automobile. It has been also found that The waster water treated by using such emulsifying agent can be provided to food chain of microorganisms to lead biodegradable decomposition thereof.

Example 22

It will be understood that the product of example 1 can be available for the industrial installation having water- or vapor-circulation apparatus such as power plant since it performs excellent function to prevent and inhibit clogging of tube and generation of water scale in vapor-discharging tube.

Example 23

It will be understood that the product of example 1 can be available for the supersonic washing process of ferrous or non-ferrous metals. Particularly, when said product was diluted in 15 times of water and used to wash the metals at 35–40° C., it showed the greatest effect. Also, in case of low temperature of the solution, 5 times diluted solution was most preferably used.

Example 24

If the product of example 1 is added to 3 times of cutting oil or lubricant, thermal resistance and lubrication ability thereof tends to increase so that freezing of cooling water and solidification of oil can be efficiently prevented.

When said product is used as a lubricating agent of metal cutting saw blade, it can increase cutting power because of its ability to reduce load of the saw blade. Also, it can remove the adhesiveness of blade, satisfy the lubricating property required to cut aluminum and the cooling effect needed to cut titanium.

A solution of the product diluted in 5 times of water can replace the cutting oil in case of threading of stainless steel pipe. Alternatively, another solution of the product diluted in 3 times of water can show superior lubricating effect in the formation of tapping holes in magnesium steel.

Accordingly, such additional characteristics of the present inventive product allow the product to be useful in various applications such as mechanical industries and machinery plants.

Example 24

The product of example 1 has excellent features to remove different metal compounds and to inhibit re-corrosion thereof. Therefore, by rubbing, spraying or depositing said product to wash the painted or non-painted surface of a metal whatever it is ferrous or non-ferrous metal, it is possible to satisfy the requirement of MIL-C-44361-613-Class 2 as one of American Military Specification Regulation to eliminate oil and grease.

Therefore, said product can be used in the washing process of repairing parts for electrical or mechanical apparatus, and also show flexibility to rinse or handle such as typewriter, cash register, calculating device, computer, cash accounting device, counter, parking meter, telephone component and the like.

Finally, the product has originally high lubricating point, good capability to remove metal oxides and perform its buffer effect to alleviate the re-corrosion phenomenon.

Example 26

The product, water and standard solvent or diesel was mixed in a ration of 1:3:5 times by weight of them, respectively.

The mixture was adjusted by adding solvent-like emulsifying agent to advantageously effect the decarbonization of deposited carbon and to remove gas residues in aircraft or automobile. Also the present product can favorably effect to solidified carbon or dust, exhaust gas residues, vanish, fuel glaze on so on which are difficult to remove, and also in case of being required highly technical consideration of buffering or inhibiting infringement on metal or coating surface of aircraft during washing process. When a vertical washing solution should coat at right angle to a surface perpendicular to the solution, a solution prepared by mixing the product of example 1 and water in a ratio of 1:1 then adding it into 5 times a standard solvent or diesel oil to form solvent-type emulsifying agent is preferably used. It is very important that such combination ratio beneficially effects to form a detergent having a higher viscous ability to allow the detergent to be adhered to the vertical surface, thereby, its principle capability of washing.

Therefore, such performance test demonstrated that the present product satisfies the conditions and/or specifications defined by MIC-C, Boeing Douglas Co., Rockheed for detergent of outer side of aircraft.

At first, the product in example 1 is added to a circulation water in 100:1 ratio and used to run and wash the boiler with the circulation water. After the washing, the boiler is added with the product in 100:1 ratio and runs and is subject to data determination thereof. As a result, it was demonstrated that the boiler has increased thermal efficiency by 20–30% and showed reduction of fuel consumption by 35–40% for the boiler continuously circulation-activating.

However, when the boiler was stopping for one or two days the thermal efficiency was sharply decreased and in case of continuously running the boiler, could be continuously increased by supporting the product of example 1 by about 3% every 5 days. In a practical and preferred embodiment of the present invention, such as industrial or high-compressing boilers were excluded from the present test due to the generation of air bubbles. Also, the test was performed to determine the utility of low-pressure and multi-pipes flowing-through type boiler. The boiler subjected are as follows:

1) Type: multi-pipes flowing-through type vapor boiler
2) Model No.: FIX-1000 WK (Johnson, Japan)
3) Heating Surface Area: 1.92 m$^2$
4) Maximum work pressure: 10 kg/cm$^2$

Example 28

It was demonstrated that the product of example 1 has much favorable wetting ability to collect dust. More practically, a solution of the product in 80–100 times of water can ideally collect dust. Thus, this product has utility for the applications with problems of dust generation such as assembly apparatus of electronics industry, manufacturing industries such as pharmaceutical, food, spinning mills and textile industry and/or storage shed of given missiles with high sensitivity to electronic response, furniture, civil engineering or etc. The product is provided for optimum effect by means of fog-spraying method using injection nozzles with diluted solution indoors; oil truck or sprinkler in case of civil engineering and building field outdoors. A diluted solution is produced by introducing water into the tank then adding the product of example 1. In order to prevent scattering of flys or powders, about 2% phyco-colloids are added to said product to increase viscosity thereof, thereby, to efficiently control scattering of the powers at spraying the solution to powders

Example 29

The product of example 1 has high entrapping ability of hard water ions, and when the hard water has up to 50 grains of the water hardness, the product is added to water held in the boiler in an amount of 0.2% by weight and shows good ability to inhibit generation of scales.

In addition, said product can decompose water scum and have utility to various application including water pipe, sewage disposal plant and so on.

As the use of product, it is diluted in water at a low density ratio then gradually increasing the amount of addition because of the water discharge being varied depending on the position.

Examples 30

It will be under stood that the product of example 1 is preferably used in applications having area difficult to wash it.

Accordingly, the product which is stable to human body and has ecologically stable and environmentally friendship accepters can be used in a wide application in consideration for the combination of various functions not limited to washing process. As illustrated above, the present inventive product has specified technical features different from existing detergents.

More practically, additional functions beside the washing are listed as follows;

1) the product of example 1 is diluted in 30 times of water to form a diluted solution, which washes wall or acrylic wall or surface of bath tub to be painted without forming cracks or soap scum and without generating plasticizer. In case of washing wooden material, it demonstrates neither stain, striped lines nor adverse-effect such as coarse-grained texture. Thus, the present product can be applied to bath tub, toilet bowl, as well as bowling pin, floor, desk, chair, cabinet, railing, etc. by spraying the solution onto it. The sprayed solution has colloidal particles dispersed into the solution to form a coating film onto the washed surface and to buff or reduce the attraction to prevent dust powders from adsorbing on the surface. With a microscope it was monitored the dust particles were not adsorbed to surface of the object and were suspended in the solution.

2) The product of example 1 is diluted in 80–100 times of water to form a diluted solution, which is used to clean footcloth or carpet with a vacuum cleaner and shows excellent benefits to entrap bacteria or other microorganisms surviving within fiber or hair thereof. Then, the product can perform sanitary washing process without other general detergent.

Furthermore, the product of example 1 is diluted in 40 times of water to form a diluted solution, which is used to remove stain with a soft brush or sponge. In this case, if the density of the diluted solution is high the solution it causes the remained solution on carpet to stain bottom side of footwear. Thus, the density of the diluted solution should be low in order to efficiently remove the stain or other trace.

3) The product of example 1 is applicable to wash any kind of textiles such as bed cover, towel, table cover, napkin and so on and remove even stains difficult to remove with common detergent, by a specific physical combination of the product.

Examples of the stains and spots removed by the present inventive product are as follows:

Alcohol, food stain, ammonia, fruit, mustard, beer, fruit juice, bloodstain, gelatin, nicotine, paste, vegetable oil, animal fat, candy, ointment, chewing gum, light rust, chocolate, cement for housing, shoe polish, cocktail, ice cream, smoke, stain, coffee, ink, soft drink, cologne water, perfume, iodine, color pen, ketchup, sugar, lipstick, paste stain, cosmetic, mayonnaise, black tea, medicine, watercolor, metallic brightener, water stain, dye, non-acrylic wax, egg, mold, wine, etc. For case of hard stain, the product of example 1 not diluted is directly applied to the stain area and, after about 15 minutes, is washed by fresh water to result in a clean state without stain. Also, for very severe and old stains, the product of example 1 not diluted is directly applied to the stain area and, by rubbing it with hands or with a soft brush and after standing it for 15–30 minutes, the resulting material is washed with fresh water to obtain a clean and non-stained state.

The product of example 1 is diluted in water in a ratio of 1 ounce (about 28 cc): 1 gallons (3.785 liters) for both to a solution capable of mixed with detergent powder or BORAX available from commercial market. The combined mixture has much stronger washing ability, thereby, the amount of detergent powder being remarkably reduced. The combined mixture can solve the problem of skin-stimulation caused by residual of the detergent powder because of the amount of the detergent powder being reduced. Thus, it is possible to prevent re-precipitation of the contaminants and to accomplish clear and more brighten washing process.

4) The product of example 1 is diluted in 80–100 times of water to form a diluted solution, which is used to wash glass bowl and/or ceramic wear and to obtain high crystallinity and transparency washing result without finger print stain. This characteristic is widely utilized in various applications such as sanitary washing of cup or crystal wear used in hotel or bar, chandelier, decorations, etc.

5) The product of example 1 is diluted in 40 times of water to form a diluted solution, which is spraying to acoustical tile and absorbed into a catch cloth to remove accumulated nicotine. This product is also used to wash surfaces of vinyl, plastic, formica, leather, wooden object, ceramic, fiber and textile, glass, ivory or chromium without damage to them.

The product of example 1 is diluted in 80–100 times of water to form a diluted solution, which is added to cement to result the mixture to be effectively dispersed and absorbed into sands at high speed, to rapidly progress flowing of air to prompt the condensation with high density and, for instance cement, to noticeably reduce stress cracks depending on change of temperature after drying due to thermal resistant gelatin film between condensation particles. Accordingly, the product having low-surface tension and high-dispersion ability extensively effects to hydrate and condensate supermicron particles or to form concentrate of cement.

7) The product of example 1 is applicable to wash apparatus, machinery, installation in food industrial process, and satisfies the specification regulation applied to mechanical or vapor-applicable washing processes as a cleaner for surface of the food working area, for example, operated according to a study program for poultry, shellfish and egg working articles by agricultural administration, U.S.A.

In particular, when the product is used in the vapor-applicable washing process, the can replace 2 kg of conventional powdered detergent as used in only 30–60 g in order to solve the clogging of valve or pipes by the detergent or to remove water scum on vapor-coil. Also, for vapor-injection nozzle, 1 kg of detergent powders can be replaced with 10–15 g of the present inventive product. Accordingly, said product is safe to any kind of surfaces to allow application of vapor and to extend life time of the washer because of no water scum deposited on the vapor-coil.

8) The product of example 1 showed no residuals of bacteria when it was used as kitchen detergent in homes and restaurants. Thus, said product has advantageous of adsorbing, entrapping and washing bacteria without toxic elements such as quartemary ammonium chlorinate salt as a known bactericide or sterilizer so that it can be useful in a wide application such as sanitary washing process.

9) The product of example 1 effects to allow animal to have softer and more lustrous lie of fur and/or hair and to remove the smell when it was used in bathing the animal having fur. By a microscopic inspection, no parasite was monitored in the animal bathed with the present inventive product. Thus, it will be appreciated that said product is useful in a specific application such as the treatment of fur coats in home and the care of pets.

10) When the product of example 1 was prepared by adding chelate agents having entrapping ability various hard water ions and within a hard water having 65.3 crane, it was demonstrated that said product has excellent entrapping ability as a stronger washing power by 45.3% compared with a control detergent without chelate agents. The control detergent was prepared by using LAS (Linear Alkylbenzene Sulfonic acid) synthetic detergent as a base material and adding chelate agents having entrapping ability of different hard water ions. The results of this examination were listed in Table 8 below:

TABLE 8

| LAS(%) | $Na_2SO_4$(%) | $Na_2CO_3$(%) | $Na_2SiO_2$(%) | $Na_2P_2O_7$(%) | Zeolite A | Washing rate(%) |
|---|---|---|---|---|---|---|
| No prepared | 0 | 0 | 0 | 0 | 0 | 100 |
| 40 | 60 | | | | | 116.5 |
| 40 | 20 | 40 | | | | 118.0 |
| 40 | 20 | | 40 | | | 134.0 |
| 40 | 20 | | 20 | 20 | | 141.0 |
| 40 | 20 | | | 40 | | 142.0 |
| 40 | | | | 10 | 20 | 142.5 |
| Product of example 1 | 0 | 0 | 0 | 0 | | 145.3 |

As illustrated above, it was demonstrated that the product of example 1 has a buffering activity to form stable complex with metal ions in hard water within a wide range of pH8.3–10.5 and to block those metal ions so that it can have greater dispersing capability to disperse contaminants during washing process, compared with other chelate agents. Especially, the inventive product is a porous colloidal active material and had additional function to easily entrap hydrated $Mg^{++}$ ions having particle size larger than the pore of such material. Thus, the product efficiently performs to buffer such hydrated magnesium ions. Furthermore, such product is conveniently applicable to a washing process for home use requiring relatively short-time treatment since it does not take long time for activating the ion-exchanging reaction with $Ca^{++}$ ions. In addition, the product can make dispersion of contaminant to be in stable state and has superior functional advantage of buffering re-precipitation activity with fiber because of its high hydrophilic property.

As the test cloth treated in the test disclosed above, used was dirty cotton cloth with contaminants having composition below;

TABLE 9

Composition of contaminants in test cloth (% by weight)

| Components | Content |
|---|---|
| Moisture | 3 |
| Sand, soil | 45 |
| Gypsum (calcium compound) | 5 |
| Lime | 5 |
| Animal protein | 12 |
| Molecules dissolved in alcohol(resin, gum, fatty acid) | 10 |
| Molecules dissolved in ether(fat, oil, rubber, asphalt) | 10 |
| others | 2 |

11) The product of example 1 has a characteristic feature of CdS sol to efficiently absorb UV and radiate blue side visible ray having short wavelength so that it can lead white color to be whiter and brighter even without addition of fluorescent agent. Practically, in case of using the fluorescent whitening agent, it was found that the whitening agent widely used in washing process comprises selectively fluorescent materials with relatively high dyeing-speed and durability against chlorine bleaching agent, thereby, is less effective to synthetic fibers such as nylon or polyester during washing process. On the contrary, the present inventive product provides excellent whiteness and brighter coloring effect to even the synthetic fibers including nylon or polyester without causing yellowness appearance, compared with the general fluorescent whitening agent. Also, when used the present product, the cloth having even pastel tone colors was not dimmed or decolorated contrary to the whitening agent.

12) As a result of determining and comparing washing efficiency of both of the product of example 1 and existing bleaching agent, such product without adding sodium perborate($NaBO_3 \cdot 4H_2O$) or sodium carbonate peroxide ($NaCO_3 \cdot 2H_2O$) showed superior washing effect over the known bleaching agent.

TABLE 10

Washing effect of the detergent combined with bleaching agent (increasing rate of whiteness (%))

| Detergent(linear alkylbenzene sulfonic acid) | Temperature (° C.) | | |
|---|---|---|---|
| | 20 | 40 | 60 |
| Detergent(without bleaching agent) | 3.8 | 4.9 | 4.8 |
| Detergent + sodium perborate ($NaBO_3 \cdot 4H_2O$) | 5.8 | 7.8 | 10.3 |
| Detergent + sodium carbonate ($NaCO_3 \cdot 2H_2O_2$) | 6.3 | 8.4 | 11.6 |
| Product of example 1 (without bleaching agent) | 6.5 | 9.2 | 12.3 |

13) The effect of the present product to starch and protein decomposition was tested during the washing process. The results demonstrated that, in spite of not containing enzymes such as amylase, the phycocolloid contained in the product activated the starch and protein to be completely decomposed so that the product even without protease can by a mechanism the product being inserted between fibers together with other materials such as skin desorbed material, water, blood, protein food material and molds and decomposing the protein particles into water-soluble amino acid materials. Further, the enzymes mainly used in the washing process have varied activities depending on pH, temperature and surfactants, thereby, needed a professional knowledge to select the desired enzymes and the bath to be kept in desired constant temperature. However, for the present product, such conditions and/or requirements are unnecessary and, rather than, it appears greatly stable activity within a wide range of temperature. The result of this test was given in Table 11 below;

Comparison of Relative Activity Depending pH Values:

Considering the proper pH conditions depending on the kinds of enzyme, alkalase and asperase were selected and compared each other, both of them being used common detergents and having good activity in alkaline system. As a result, the alkalase showed its maximum activity around pH9 while for the asperase being appeared in a wider range of pH10–11.

However, the product of example 1 demonstrated relatively stable activity in a range of pH8–10.5 and, even at high temperature, continued its stability. The result of this comparison test obtained was shown in Table 11 below;

TABLE 11

Relative activity of enzyme depending on pH values

| Kind of enzyme & relative activity(%) | PH Condition | | | | | | | | |
|---|---|---|---|---|---|---|---|---|---|
| | 8 | 8.5 | 9 | 9.5 | 10 | 10.5 | 11 | 11.5 | 12 |
| Asperase | | | 63 | 90 | 92 | 95 | 93 | 87 | 78 |
| Alkalase | | | 87 | 89 | 83 | 65 | 15 | | |
| Product of example 1 | 87 | 87 | 87 | 93 | 98 | 98 | | | |

TABLE 12

Relative activity of enzyme depending on temperature

| Enzyme | Temperature Condition (° C.) | | | | | | |
|---|---|---|---|---|---|---|---|
| | 20 | 30 | 40 | 50 | 60 | 70 | 80 |
| Activity of alkalase (%) | | 25 | 38 | 75 | 92 | 45 | |
| Product of example 1 | 18 | 28 | 42 | 80 | 95 | 97 | 98 |

Comparison test of enzymes and washing ability

| Washing agent and enzymes | relative washing rate(%) |
|---|---|
| Linear alkylbenzene sulfonic acid (only) | 100 |
| Linear alkylbenzene sulfonic acid + alkalase | 105 |
| Na-α-olefin sulfonic acid + Alkalase | 128 |
| Product of example 1 (without addition of enzyme) | 128 |

The product of example 1 was tested for adoptability to the requirements of washing and scouring processes and practical efficacy thereof.

Said product is an alkaline colloidal activated compound having pH9.5–10 at normal density. This product is conversed into weak-alkaline water-soluble solution having pH8–8.3 by diluting the product into 1–2% water-soluble solution. The product does not generate weak acid or base by means of reaction with $H^+$ or $OH^-$ ions in water.

The product was under experiments in relation with various fibers and demonstrates excellent effects. Particularly, the product did not damage or loss the fibers such as nylon, polyester, as diluted with a diluent solution having less than pH8.5. These results are more specifically described below:

1) In order to test adoptability of the product of example 1 for the requirements of cloths washing process, preparing artificially secretions from sebaceous gland, body wastes, metabolic desorbed material, dirt caused from exterior system and so on and staining samples cloth with each of the artificial dirts. Afterward, it was demonstrated that the product appeared greatly superior washing ability for the secretions and dirt from exterior system after washing and rinsing those. The washing rates for each of the stains is illustrated as follows:

| Stains from physiological secretions and washing rate | | |
|---|---|---|
| Components of stains | composition(%) | washing rate(%) |
| Triglyceroide | 18.4 | 98 |
| Free fatty acid | 14.6 | 93.8 |
| Paraffine | 0.7 | 98 |
| Squaline | 1.9 | 98.5 |
| Cholesterol | 2.2 | 96.8 |
| Cholesterol ester | 10.0 | 97.0 |
| Mono/di glyceroid/alcohol | 11.7 | 99.5 |
| Nitrogen compound | 21.5 | 99.0 |
| Ash | 3.0 | 97.3 |
| Sodium chloride | 15.3 | 100.0 |

\* Composition of stains is average value of the contamination indices detected in every seasons(spring, summer, autumn and winter)
\* Washing rate is a mean of 5 times determined values for sample cloth after washing process.

Composition of stains is average value of the contamination indices detected in every seasons (spring, summer, autumn and winter)

Washing rate is a mean of 5 times determined values for sample cloth after washing process.

| Stains from exterior system and washing rate | | |
|---|---|---|
| Components of stains | composition(%) | washing rate(%) |
| Insoluble component | 14.4 | 100.0 |
| Ether soluble acid | 8.3 | 95 |
| Carbon synthetic compound | 25.7 | 100.0 |
| Ash | 53.5 | 97.3 |
| Silicon dioxide($SiO_2$) | 24.5 | 98.7 |
| Calcium dioxide($CaO_2$) | 7.0 | 99.0 |
| pH(10% slurry) | 7.4 | — |
| dust particles(less 4 $\mu$) | 53.0 | 100 |

\* Composition of stains is composition of contents comprising typical dust in the atmosphere of city
\* Washing rate is a mean of 5 times determined values for sample cloth after washing process.

With regard to the stains artificially prepared for this experiment, each component of the stains is not less than 1%, which is classified to water-soluble, oil-soluble or other insoluble solids since personals wearing clothes are living in different environments and the stains are varied.

Example 32

With regard to dirt modified by heat or chemicals or such as sweat modified by oxidation difficult to decompose in water, the product of example 1 having 0.3% activity was tested for its washing ability. The stained cloths were placed into a container together with the product and washed and boiled at 60–65° C. for 15 minutes, then rinsed with fresh water. The treated cloths showed greatly excellent washing ability, thereby, leveled as +2.

Example 33

In order to carry out the test of washing ability of the product of example 1 having 0.3% activity against oil-soluble and lipophilic dirt not removed by common detergent, the stained cloths heated and washed at 50° C. together with the product, then rinsed with fresh water. The result obtained was given as follows:

| Type of Stains and washing rate | |
|---|---|
| Type of Stains | washing rate (%) |
| Modified water-soluble stain | 92.5 |
| Neutral fat | 73.0 |
| Free fatty acid | 93.8 |

In order to carry out the test of washing ability of the product of example 1 having 0.3% activity fine and solid insoluble dirt difficult to disperse and wash it by common detergent due to it being inserted between fibers, the stained cloths washed with the product, then rinsed with fresh water. The treated cloths showed greatly excellent washing ability; The result obtained was given as follows:

| Washing ability of insoluble solid stains | | |
|---|---|---|
| Kind of cloths | particle size($\mu$m) | surface Reflection rate(%) |
| Nylon | 2 | 83 |
| Cotton | 2 | 78 |
| Wool | 2 | 72 |

\* stained particle is carbon black(0.8 g), hardened fat (1 g), d flowing paraffin(3 g) and carbon tetrachloride(800 g)
\* Surface reflection rate is determined as follow:

$$D = \frac{R_w - R_s}{R_o - R_s} \times 100\%$$

D; washing rate $R_o$; surface reflection rate of white cloths $R_s$; surface reflection rate of stained cloths $R_w$; surface reflection rate of washed cloths after washing process

Example 35

The results of scouring effect test for the product of example 1 against various fibers is as follows;

1) cotton-cellulose ($C_6H_{10}O_5$)

specific gravity; 1.54 moisture regain; 7.0–8.5% tensile strength; 60–120×$10^3$ psi

Vat dyes, azo dyes, basic dyes, mercerizing agent, coloring agent, sulfur and reactant pigments were applied to cotton cloths, then each of the treated cotton cloths was washed by the product of example 1 having 0.3% of activity. As a result, all of the treated cloths showed glossy color and smooth feel of scouring ability.

2) For cotton cloths treated by adding the product of example 1 to mercerize, the effect of the product to scouring ability was tested and compared with other activating agent; The result obtained was given as follows:

TABLE 13

Residual content of wax at mercerization of cotton cloth and whiteness (Comparative example 1)

| | Residual wax (%) | | |
|---|---|---|---|
| | Before bleaching | After breaching | Whiteness (5) |
| Without addition of surfactant | 0.26 | 0–30 | 72 |
| With addition of product of example 1, 0.2% | 0.09 | 0.15 | 74 |
| With addition of Alkyl sulfate salt, 0.2% | 0.15 | 0.20 | 77 |

Test cloth:(7.5 hour: 22 sq. in) initial content of wax: 1.11%

TABLE 14

Addition test of 0.2% of the product from example 1 depending on contents of caustic soda at mercerization of cotton cloth (Comparative Example 2)

| Saturated solution | Content of residual wax (%) | | | | | | | |
|---|---|---|---|---|---|---|---|---|
| Caustic soda | 10 minutes steaming | | | | 20 minutes steaming | | | |
| content(%) | 10 | 6 | 4 | 2 | 10 | 6 | 4 | 2 |
| No surfactant | 0.324 | 0.367 | 0.363 | 0.404 | 0.350 | 0.380 | 0.405 | 0.435 |
| Turkey red oil | 0.2421 | 0.315 | 0.341 | 0.396 | 0.262 | 0.321 | 0.336 | 0.415 |
| Casolene oil HS | 0.227 | 0.301 | 0.381 | 0.421 | 0.296 | 0.364 | 0.376 | 0.422 |
| Teepol X | 0.307 | 0.376 | 0.369 | 0.463 | 0.282 | 0.325 | 0.371 | 0.491 |
| Lissolamine A | 0.228 | 0.299 | 0.439 | 0.433 | 0.241 | 0.353 | 0.395 | 0.430 |
| Caster oil soap | 0.063 | 0.200 | 0.238 | 0.219 | 0.046 | 0.228 | 0.254 | 0.239 |
| Product of example 1 | 0.163 | 0.161 | 0.285 | 0.297 | 0.132 | 0.135 | 0.152 | 0.301 |

TABLE 15

Addition test of 0.2% of the product from example 1 depending on contents of caustic soda at mercerization of cotton cloth (Comparative example 3)

| Saturated solution | Wetting Time (sec) | | | | | | | |
|---|---|---|---|---|---|---|---|---|
| Caustic soda | 10 minutes steaming | | | | 20 minutes steaming | | | |
| content(%) | 10 | 6 | 4 | 2 | 10 | 6 | 4 | 2 |
| No surfactant | 2.0 | 5.3 | 12.2 | 8.2 | 1.5 | 2.0 | 1.4 | 8.9 |
| Turkey red oil | <1.0* | <1.0 | 1.3 | 3.4 | <0* | <1.0 | <1.0 | 2.6 |
| Casolene oil HS | <1.0* | <1.0 | <1.0 | 2.7 | <1.0* | <1.0 | <1.0 | 3.0 |
| Teepol X | <1.0 | 1.2 | 4.9 | 290.0 | <1.0 | <1.0 | <1.0 | 1.2 |
| Lissolamine A | <1.0* | <1.0 | <1.0 | 2.0 | <1.0* | <1.0 | <1.0 | 3.0 |
| Caster oil soap | <1.0* | <1.0 | 1.7 | 2.6 | <1.0* | <1.0 | 1.0 | 1.6 |
| Product of example 1 | <1.0* | <1.0 | 1.3 | 295.3 | <1.0* | <1.0 | 1.0 | 1.3 |

Instantaneous wetting
*Wool textile $(C_{42}H_{157}O_{15}N_5S)x$
specific gravity: 1.32
moisture regain: 11–17%
tensile strength: $17$–$29 \times 10^3$ psi Such wool textile is broken in hot sulfuric acid but has a resistance to weak acid.

Accordingly, sample cloths dyed with any of acidic, milling, chromium, mercerizing or indigo dyes were placed in the product of example 1 having 0.3 activity, respectively, and shaken to be lightly washed. Thereafter, the washed cloths were rinsing with fresh water and drying in the shade out of sun light. The test demonstrated that adverse effects to damage original polish or gloss of the cloths were not monitored. As a result, all of the treated cloths showed glossy color and smooth feel of scouring ability. Especially, the washed sample cloths showed higher sun-light resistance and did not appear yellowness 60 days after washing process.

Example 36

In order to test adoptability to soaping treatment carried out during post-dying process for the product of example 1, soaping treatment of Vat Dyes or colorless dyes were carried out. As a result, the product did not create change of color to the dye substrates. On the contrary, it appeared that the shade of color was progressively developed. The test demonstrated that the product can effectively reduce loosing dyes. The spectrophotometric inspection result of the product through cellulose film is given in Table 16 below.

TABLE 16

Double-coloration of Dry pigments (64)

| Grade | dyes | Soaping | C=O | C—H | Visible |
|---|---|---|---|---|---|
| 1 | C.I. Vat Blue 20 | Before | □□□□□‖ | ⊥ | ‖ |
| | | After | ⊥ | ‖ | ⊥ |
| 1 | C.I. Vat Yellow 2 | Before | ‖ | — | ‖ |
| | | After | ⊥ | — | ⊥ |
| 2 | C.I Vat Orange 9 | Before | ⊥ | ‖ | No |
| | | After | ⊥ | ‖ | ⊥ |
| 2 | C.I. Vat Green 1 | Before | ⊥ | ‖ | ‖ |
| | | After | ⊥ | ‖ | ⊥ |
| 3 | Benzamido derivative (C.I. Vat Orange 15) | Before | ‖ | No | ‖ |
| | | After | ‖ | No | ‖ |
| 4 | Indigoid dyes | Before | ⊥ | — | ‖ |
| | | after | ⊥ | — | ⊥ |

Example 37

Scouring process of wool fiber was carried out to test the product of example 1 in relation to adoptability and practical efficacy of the requirement for scouring process. The test was progressed as the following procedures:

1) In suint washing process, the product of example having 0.5%(w/v) activity in a solution state was proved to effectively remove waste materials such as micro-organic modified wax, wax and fat secreted from sweat gland and as part of wool fur and other waste materials discharged in fabric industry. The product has a sufficient washing ability to remove such waste material by saponification value of the wax containing $K^+$ and $Na^+$ ions and upwarding activity thereof. Moreover, because suitable pH for floating dirt on surface of the solution is around 10 while for raising entrapped dirt it needs about pH 7.0, generally Sodium carbonate was added to control pH values and it derived reduction of washing ability and yellowness of wool fibers due to the alkaline component of the additive. Therefore, in order to prevent the above reactions it required a confused separation process.

Compared with the typical process, the present product can easily buffer the damage caused by alkaline material and separate other insoluble materials at even normal range of pH8.0 by the characteristic mechanism of the colloidal materials.

2) In Emulsifying and washing processes of wool fiber, the product of example 1 having 0.5%(w/v) activity was under the suint washing process. The result demonstrated that the product provided excellent washing effect and accomplished reduction of working processes. Compare with a practical case of typical detergents comprising sodium rollainate (2–4%) and sodium carbonate (2%) which are severely difficult to maintain a proper pH value, and generate yellowness caused by alkaline damage and precipitation of beneficial free saponic acid, the present product has never pH problem and completely buffers the alkaline damage without additives including entrapping agent such as calgon or chelate agent to create the original color of wool and to achieve preferable emulsification and washing functional effects. The result obtained were given as follows:

TABLE 17

Scouring Performance Test for Wool

| Factor | Result(%) |
|---|---|
| Residual grease (%) | 0.987 |
| Residual ash (5) | 1.741 |
| Yellowness(Y–Z) | 1.2 |
| Brightness(Y) | 64.5 | amount of grease residual in sample after scouring (%)

amount of ash residual in sample after scouring (%)

color of wool after scouring in relation to yellowness(Y) and Brightness(Y-Z)

6 greasy wool samples (10.0 gm) were continuously scoured under the condition as shown in Table 18 and 19

TABLE 18

Characteristics of standard wool (for the tested)

| Diameter of fiber 20.9 $\mu m$ | Wool base 65.5% |
|---|---|
| Humidity 10.4% | Wax 8.5% |
| Suint 5.3% | Dust 8.5% |
| Veg. Mater | Ash 11.0% |

TABLE 19

Test Evaluation Method

| Breaker | Volume(ml) | Temperature (° C.) | Residual time (min) | Wt. Of added (g/ 400 ml) | Detergent (% w/v) |
|---|---|---|---|---|---|
| 1 | 400 | 60 | 1 | 2.0 | 0.50 |
| 2 | 400 | 60 | 1 | 2.0 | 0.50 |
| 3 | 400 | 60 | 1 | 1.0 | 0.25 |
| 4 | 2000 | 60 | 2 | — | — |

Each of the first samples were placed in respective breaker with agitation. Water was extracted between breakers under vacuum condition and the extracted water was recycled to the breakers to be the amount same at the original state.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for manufacturing colloid aluminum silica gel, comprising the steps of:

dissolving a mixing solution of aluminum hydroxide in sulfuric acid, wherein the mixture includes aluminum oxide, silicic acid, potassium, iron oxide, sulfuric acid and water;

adding potassium sulfate solution into the solution from (a), and stirring the mixture at a low temperature to produce compositions containing soluble aluminum double salt;

purifying the compositions of the step (b) to obtain aluminum potassium sulfate with high purity and density;

adding aluminum silicate and water to the aluminum potassium sulfate of the step (c) to produce alkali metal polysilicate-sulfate water salt chelate;

polymerizing and precipitating the alkali metal polysilicate-sulfate water salt chelate at a low temperature to produce pectograph of aluminum silicate sieve;

producing chelate by adding magnesia, iron oxide, calcium hydroxide, sodium oxide, potassium oxide, and distilled water in sequence;

purifying and drying the chelate of the step (f) to produce dried microsphere;

melting the dried microsphere of the step (g) at a high temperature, cooling, hardening, and mixing with diluted sulfuric acid;

carrying out sequential treatments on the resultant of the step (h), that is, polymerizing, cleansing, heating, dehydrating, or drying, and performing vapor treatment, to obtain powder aluminum silicate molecular sieve with a high absorption of which particle size is under $1\mu$; and polymerizing the aluminum silicate molecular sieves with each other until they are matured to be a highly dense heel.

2. The method according to claim 1, wherein in the step (c) the compositions are continuously heated and stirred, and 0.1% of enzyme by weight is slowly dropped thereto.

3. The method according to claim 1, wherein in the step (d) aluminum sulfate and aluminum silicate are mixed at a ratio of 1:3 by weight and water is added to produce 24-water salt alkali metal polysilicate-sulfate chelates.

4. The method according to claim 1 further comprise a step, in which the matured heel from the step (j) passes through an ion-exchange resin layer several times to produce very pure and consistent colloid aluminum silica gel, and later the consistent colloid is crushed.

* * * * *